US011986948B1

(12) United States Patent
Gillund et al.

(10) Patent No.: US 11,986,948 B1
(45) Date of Patent: May 21, 2024

(54) SIX DEGREES OF FREEDOM COMPLIANT FLEXURE AND AUTONOMOUS ASSEMBLY USING SAME

(71) Applicant: National Technology & Engineering Solutions of Sandia, LLC, Albuquerque, NM (US)

(72) Inventors: Daniel Paul Gillund, Edgewood, NM (US); Aaron M. Ison, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1057 days.

(21) Appl. No.: 16/862,697

(22) Filed: Apr. 30, 2020

Related U.S. Application Data

(60) Provisional application No. 62/872,313, filed on Jul. 10, 2019.

(51) Int. Cl.
*F16C 11/04* (2006.01)
*B25J 15/00* (2006.01)
*F16B 5/06* (2006.01)

(52) U.S. Cl.
CPC ......... *B25J 15/0028* (2013.01); *F16B 5/0692* (2013.01)

(58) Field of Classification Search
CPC .............. F16B 5/0692; Y10T 403/458; Y10T 403/455; Y10T 403/54; Y10T 403/453; Y10T 403/45; F16C 11/12; B25J 15/0028
See application file for complete search history.

(56) References Cited

U.S. PATENT DOCUMENTS

| | | | | |
|---|---|---|---|---|
| 5,797,234 | A * | 8/1998 | Theodorou | F16B 35/00 403/41 |
| 10,773,392 | B2 * | 9/2020 | Bright | B25J 9/0015 |
| 2003/0235460 | A1 * | 12/2003 | Moon | F16C 11/12 403/291 |

(Continued)

OTHER PUBLICATIONS

Hopkins, J. B. et al., "Synthesis of precision serial flexure systems using freedom and constraint topologies (FACT)," Precision Engineering (2011) 35:638-649.

*Primary Examiner* — Robert Sandy
*Assistant Examiner* — Michael S Lee
(74) *Attorney, Agent, or Firm* — Mark A. Dodd

(57) ABSTRACT

A flexure having six degrees of freedom is disclosed. The constraint and compliance of the flexure in all six degrees of freedom may be independently tuned for an application. The flexure may include various combinations of sections including, for example, straight arm and curvilinear sections. The constraint and compliance of the flexure is determined by the geometry, cross-sectional area, cross-sectional shape, and material used to form the various sections. A coupling mechanism and a corresponding method for using the coupling mechanism for automated or autonomous assembly of elements using tuned flexures is disclosed. The automated or autonomous assembly of elements employs a coupling mechanism having a motor driven grip and a coupler, in which the coupler includes a six degrees of freedom flexure. The motor driven grip and coupler may optionally include electrical or optical interconnections and self-aligning features.

18 Claims, 17 Drawing Sheets

(56) References Cited

U.S. PATENT DOCUMENTS

| | | | |
|---|---|---|---|
| 2010/0185291 A1* | 7/2010 | Jimenez | F16F 1/025 623/17.16 |
| 2012/0321377 A1* | 12/2012 | Fang | H04M 1/0283 403/291 |
| 2016/0041361 A1* | 2/2016 | Ison | F16B 2/22 248/468 |

* cited by examiner

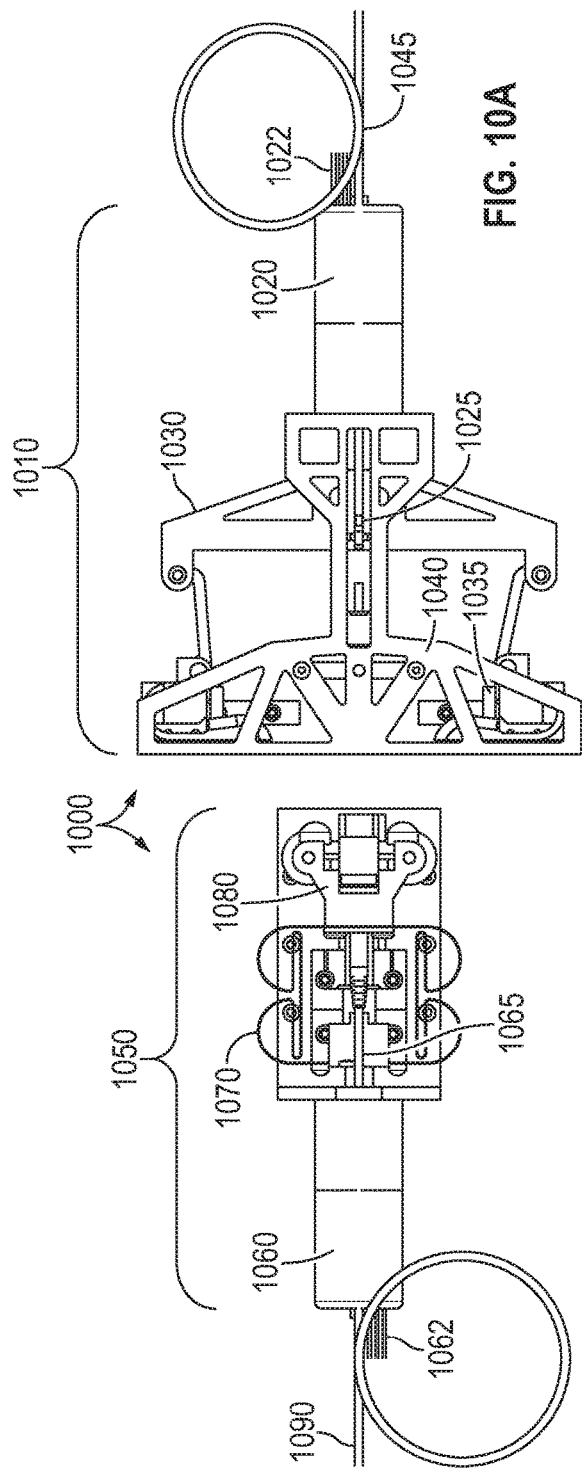
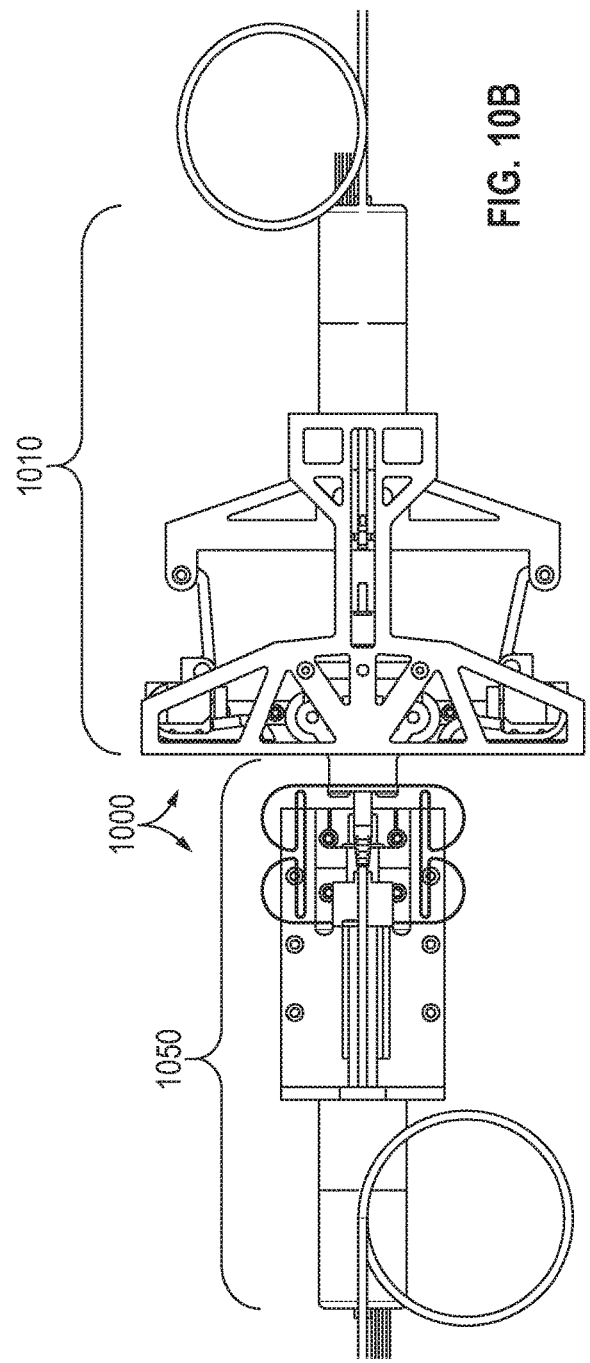

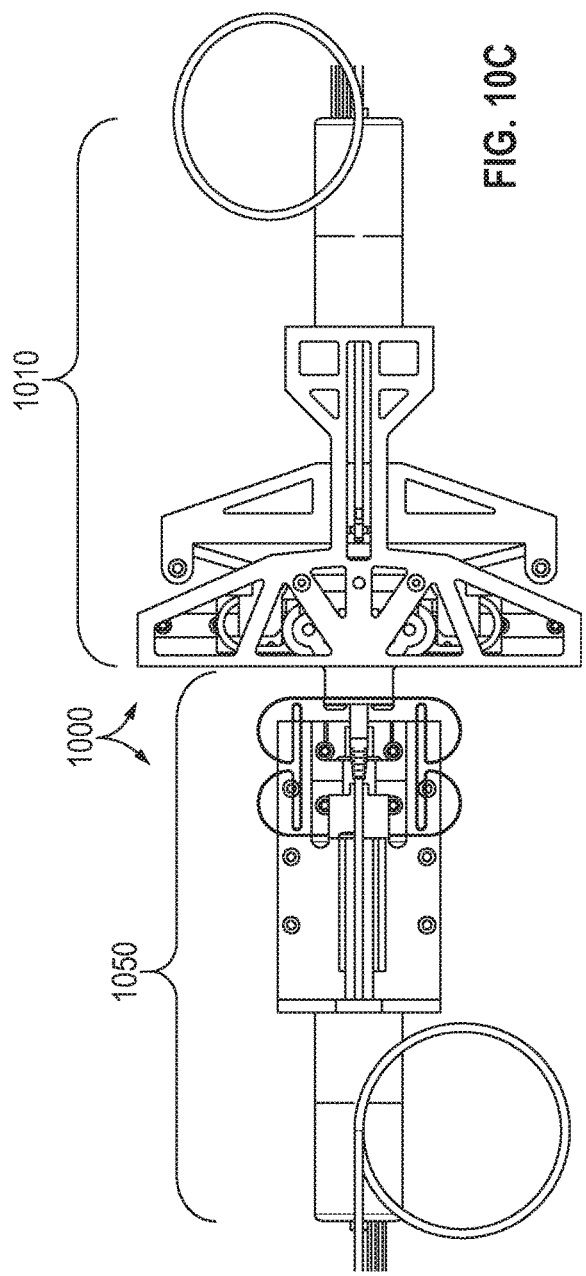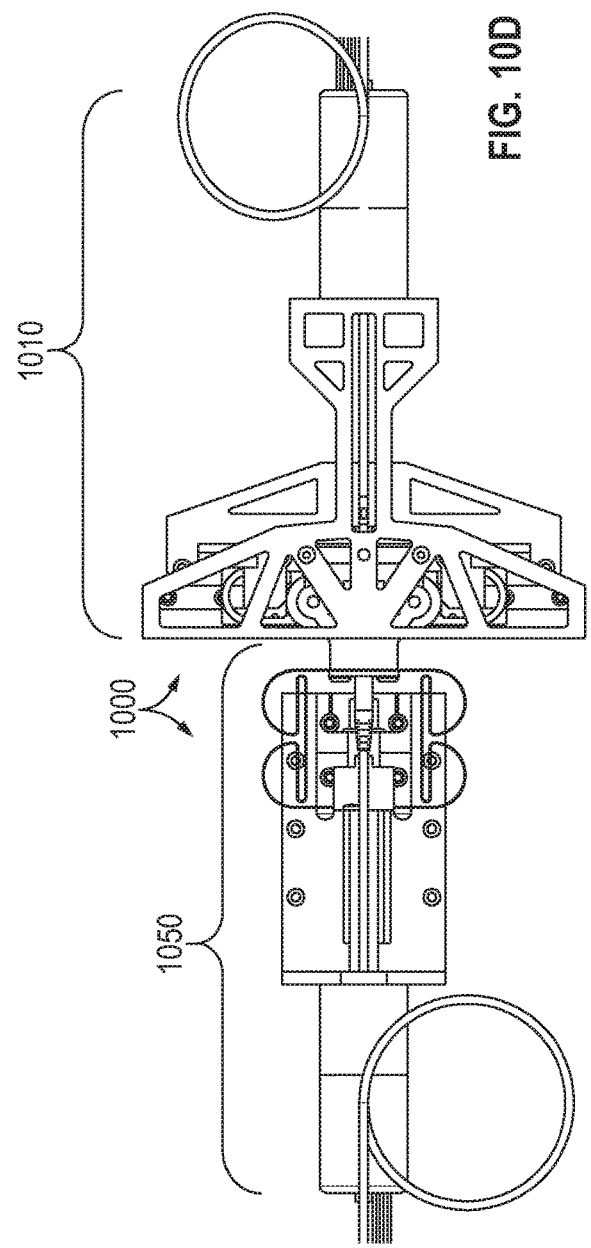

US 11,986,948 B1

SIX DEGREES OF FREEDOM COMPLIANT FLEXURE AND AUTONOMOUS ASSEMBLY USING SAME

RELATED APPLICATIONS

This application claims priority to U.S. Provisional Application No. 62/872,313, filed on Jul. 10, 2019, and entitled SIX DEGREES OF FREEDOM COMPLIANT FLEXURE AND AUTONOMOUS ASSEMBLY USING SAME, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a flexure having six degrees of freedom with hard stops in one or more degrees of freedom allowing the flexure to be tuned with respect to constraint and compliance. The present invention further relates to a coupling mechanism, including a grip and a coupler, which facilitates autonomous assembly of an array of panels, with the coupling mechanism having one or more flexures providing the compliance needed to simplify assembly.

BACKGROUND

The need to fasten together two or more elements is all pervasive in the world today. To this end, a multitude of ways to fasten elements together have been developed over the years. Some approaches employ separate fasteners, such as screws, bolts, and nails, while others meld the elements together, for example through welding, soldering, and brazing. Such fastening approaches work well when the elements can readily be aligned or can tolerate some specified amount of misalignment. Further, such fasteners work well when the elements must be held together rigidly, i.e., without flexing.

Problems arise, however, when it is difficult to align the elements or some degree of flexing between the elements is desired. To this end, various fasteners with some degree of flexibility have been developed, with these flexible fasteners being termed "flexures." These flexures may, for example, place a flexible bushing between the elements being fastened. While these flexures may work for certain applications, other applications may need six degrees of freedom, but the extent of constraint and compliance in all six degrees of freedom must be tuned. Thus, the constraint and compliance characteristics of the flexure may need to be customized for a specific application.

In several applications, the assembly of elements with fasteners or flexures is preferably automated or autonomous. Such applications include the assembly of automobiles, in which multiple body panels having various manufacturing tolerances must be fastened. This application may also benefit from allowing the assembled panels to have a predetermined amount of give, thereby absorbing some of the energy in an accident for example. Similarly, flexures may be useful for mounting engines in automobiles, where it is desirable to isolate the passengers from the torque and vibration of the engine. Other applications include the assembly of arrays of solar panels or reflective panels for telescopes that may suffer if the assembly process is overly constrained.

Thus, the need exists for flexures having six degrees of freedom with tunable constraint and compliance characteristics. Similarly, the need exists for coupling mechanisms compatible with automated or autonomous assembly processes that employ six degrees of freedom compliant flexures.

SUMMARY

One aspect of the present invention relates to a flexure having six degrees of freedom, in which the constraint and compliance in the six degrees of freedom may be tuned for an application. Depending upon the embodiment of the present invention, the six degrees of freedom may be tuned independently, semi-independently, or several degrees may be coupled together, but tunable as a set. Another aspect of the present invention relates to coupling mechanisms for use in the automated or autonomous assembly of elements using tuned flexures.

In at least one embodiment of the present invention, a flexure having six degrees of freedom includes first and second opposing mounting blocks with two or more beams connecting the first and second mounting blocks. Each of the beams includes a combination of two or more sections, for example, one curvilinear section and one straight arm section. By altering the geometry, for example, the radius of curvature or length of the curvilinear and straight arm sections, respectively, the cross-sectional area, the cross-sectional shape, and/or the material used to form the beams, the six degrees of freedom may be tuned. In at least one embodiment, potting material is placed between the beams as an added tuning mechanism and to reduce the transmission of vibrations from one mounting block to the other.

In at least one embodiment of the present invention, a coupling mechanism, including a grip and a coupler, facilitates autonomous assembly of multiple panel assemblies, with one or more flexures in the coupling mechanism providing the compliance needed to simplify assembly. Control of the coupling mechanism may be automated using a motor-controlled coupling mechanism in some embodiments, while other embodiments use springs and corresponding spring releases. The coupling mechanism may also include electrical couplers or optical connectors to facilitate the transmission of power or data between panels.

In at least one embodiment of the present invention, a six degrees of freedom flexure comprises a first mounting block, a second mounting block opposite the first mounting block, and at least two beams (the beams connecting the first mounting block to the second mounting block, each of the beams including a first section and a second section with the first section connected to the second section, each of the sections being a curvilinear section, a straight arm section, an angle section, a ball-and-socket, a hinge, or a spring).

In various embodiments of the present invention: a compliance of each of the six degrees of freedom of the flexure is determined by a geometry, a cross-sectional area, a cross-sectional shape, and/or a material of the sections; and the physical configurations of the beams are different thereby placing the six degrees of freedom flexure in tension.

In other embodiments of the present invention: the six degrees of freedom flexure comprises potting material (the potting material located between a portion of the beams); the material used to form the beams being more compliant at a first temperature than at a second temperature; and the beams provide a hard stop limit to at least one of the six degrees of freedom.

In at least one embodiment of the present invention, a coupling mechanism comprises a grip (the grip including a jaw and a jaw actuator mechanically coupled to the jaw, the jaw actuator for actuating the jaw), and a coupler (the coupler including a handle, the handle to be engaged by the jaw upon operation of the jaw actuator, and a six degrees of freedom flexure mechanically coupled to the handle).

In various embodiments of the present invention: the six degrees of freedom flexure of the coupling mechanism includes a first mounting block, a second mounting block opposite the first mounting block, and at least two beams (the beams connecting the first mounting block to the second mounting block, each of the beams including a first section and a second section with the first section connected to the second section, each of the sections being a curvilinear section, a straight arm section, an angle section, a ball-and-socket, a hinge, or a spring); and a compliance of each of the six degrees of freedom of the flexure is determined by a geometry, a cross-sectional area, a cross-sectional shape, and/or a material of the sections.

In other embodiments of the present invention: the jaw includes at least one clamp for engaging the handle upon operation of the jaw actuator; the jaw actuator includes a jaw motor, a jaw gear drive mechanically coupled to the jaw motor (the jaw gear drive for rotating upon operation of the jaw motor), and a plurality of actuation arms mechanically coupled to the jaw gear drive and to the jaw (the actuation arms for extending or retracting upon rotation of the jaw gear drive); and the actuation arms for locking the relative positions of the grip and the coupler.

In still other embodiments of the present invention: the coupler includes a handle actuator mechanically coupled to the handle (the handle actuator for extending or retracting the handle); the handle actuator includes a handle motor and a handle gear drive mechanically coupled to the handle motor and to the handle (the handle gear drive for rotating upon operation of the handle motor, for extending the handle prior to engagement of the handle by the jaw, and for retracting the handle after engagement of the handle by the jaw).

In yet other embodiments of the present invention: the grip includes a grip six degrees of freedom flexure (the grip six degrees of freedom flexure for mechanically coupling the grip to a grip panel); the coupler includes a coupler six degrees of freedom flexure (the coupler six degrees of freedom flexure for mechanically coupling the coupler to a coupler panel); and the jaw actuator includes a spring and a spring release (the spring release for releasing the spring, thereby causing the jaw to engage the handle).

In further embodiments of the present invention: the grip includes a first electrical coupler mechanically coupled to the jaw, and the coupler includes a second electrical coupler mechanically coupled to the handle (the first electrical coupler for electrically coupling to the second electrical coupler when the jaw engages the handle); the grip includes a first fiber optic connector mechanically coupled to the jaw, and the coupler includes a second fiber optic connector mechanically coupled to the handle (the first fiber optic connector for optically connecting to the second fiber optic connector when the jaw engages the handle); the grip includes a first portion of a self-aligning feature, and the coupler includes a second portion of the self-aligning feature (the first portion of the self-aligning feature and the second portion of the self-aligning feature for engaging with one another so as to align the grip and the coupler).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIGS. 10A-10F illustrate a coupling mechanism and its corresponding motions in accordance with one or more embodiments of the present invention that may be employed for autonomous assembly of an array of panels.

DETAILED DESCRIPTION

Figure 1:
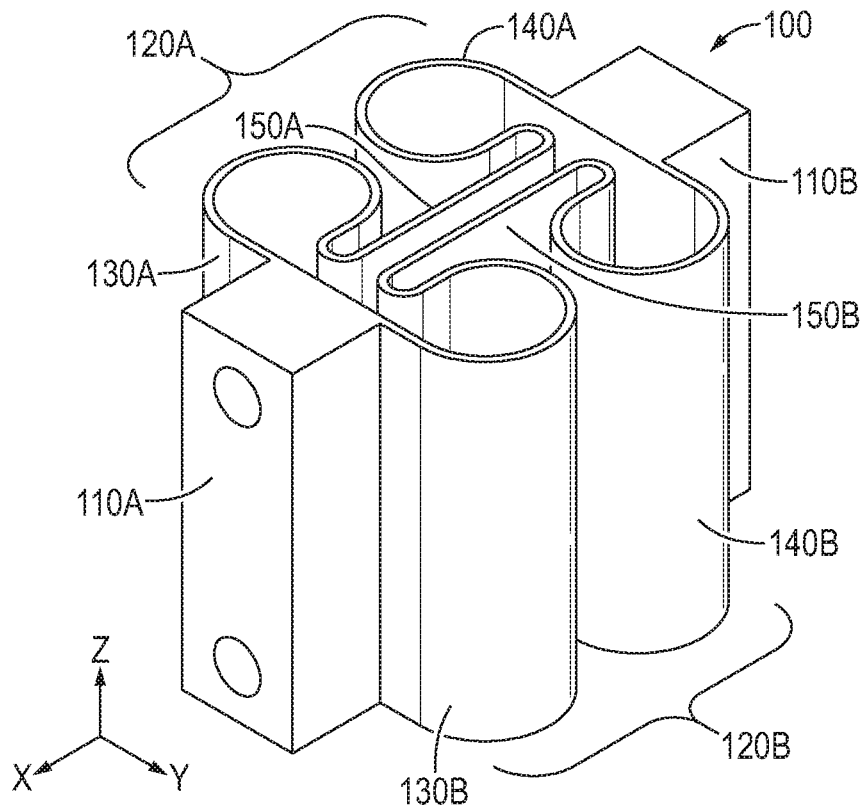
FIG. 1 is a three-dimensional (3D) rendering of a six degrees of freedom flexure in accordance with one or more embodiments of the present invention.

FIG. 1 is a 3D rendering of a six degrees of freedom flexure 100, in accordance with one or more embodiments of the present invention, tuned to have greater or lesser constraint and compliance in each of the six degrees of freedom. The flexure 100 includes a first mounting block 110A and a second mounting block 110B. The first and second mounting blocks 110A, 110B are attached to corresponding first and second elements (not illustrated) that are to be fastened together. The first and second mounting blocks 110A, 110B are attached to each other via first and second beams 120A, 120B. While in the rendering of FIG. 1 the first and second beams 120A, 120B, are symmetric, being mirror images of each other, in alternative embodiments of the present invention, the first and second beams 120A, 120B are not symmetric. This asymmetry provides a means for tuning the constraint and compliance in the six degrees of freedom of the flexure 100. The first and second beams 120A, 120B each include a corresponding first curvilinear section 130A, 130B, and a corresponding second curvilinear section 140A, 140B. The first curvilinear sections 130A, 130B are connected to the second curvilinear section 140A, 140B via corresponding straight arm sections 150A, 150B.

The constraint and compliance in the six degrees of freedom of the flexure 100 may be tuned through a variety of methods, including the materials used to form the flexure 100 and the geometries of the various components. Depending upon the application and its constraint and compliance requirements, the flexure 100 may be made of any suitable material. For example, when a highly constrained flexure 100 is needed, it may be formed of a stiff metal, for example, beryllium copper or titanium, or carbon fiber. When significant compliance is needed, the flexure 100 may be formed of a more pliable material, for example, silicone or a polymer.

A flexure 100 may be formed in numerous ways. For example, a flexure 100 may be molded, especially when the flexure 100 is formed of a more pliable material. A flexure 100 may be machined from a block of material, especially when the flexure 100 is more highly constrained. A flexure 100 may also be formed by a 3D printing process, where any of a variety of materials may be used. A flexure 100 may also be monolithic in that it is formed of a single block of material, or it may be a composite structure, formed of two or more elements that are then joined together, for example, by welding, brazing, or through the use of mechanical fasteners (bolts or screws), or an adhesive.

A flexure 100 may be made of a single material with different flexibility properties in different directions. For example, a flexure 100 made of a material that is more rigid in the z-axis direction but more flexible in the x-axis and y-axis directions will result in a flexure that has increased constraint in the z-axis direction.

A flexure 100 may also be made of different materials for tuning the constraint and compliance properties of the flexure 100. For example, constraint in the z-axis direction may be increased by using a stiffer material in the first curvilinear sections 130A, 130B, and second curvilinear sections 140A, 140B, while a more flexible material is used for the straight arm sections 150A, 150B. As another example, compliance in the y-axis direction may be increased by using a more flexible material in the first curvilinear sections 130A, 130B, and second curvilinear sections 140A, 140B, while a stiffer material is used for the straight arm sections 150A, 150B.

Similarly, depending upon the application and its constraint and compliance requirements, the shapes and sizes of the various features of the flexure 100 may be altered. For example, when increased constraint along the x-axis direction is needed, the first curvilinear sections 130A, 130B and second curvilinear sections 140A, 140B may be reduced in radius of curvature or increased in thickness. As another example, the compliance of the flexure 100 to rotation about the x-axis may be tuned by altering the height of the flexure 100 in the z-axis direction. Specifically, a shorter flexure 100 will generally have more compliance to rotation about the x-axis than a taller flexure 100.

Additionally, when increased compliance along the y-axis direction is needed, the straight arm sections 150A, 150B may be lengthened, while the first curvilinear sections 130A, 130B and second curvilinear sections 140A, 140B may be increased in radius of curvature. As another example, the compliance of the flexure 100 to rotation about the y-axis may be tuned by altering the height of the flexure 100 in the z-axis direction or altering the radius of curvature of the first curvilinear sections 130A, 130B and second curvilinear sections 140A, 140B. Specifically, a shorter flexure 100 or a flexure 100 in which the radius of curvature for the first curvilinear sections 130A, 130B and second curvilinear sections 140A, 140B is increased will generally have more compliance to rotation about the y-axis than a taller flexure 100 or one in which the radius of curvature for the first curvilinear sections 130A, 130B and second curvilinear sections 140A, 140B is decreased.

To increase compliance along the z-axis direction, the straight arm sections 150A, 150B may be lengthened, while the first curvilinear sections 130A, 130B and second curvilinear sections 140A, 140B may be increased in radius of curvature. As another example, the compliance of the flexure 100 to rotation about the z-axis may be tuned by altering the height of the flexure 100 in the z-axis direction or altering the radius of curvature of the first curvilinear sections 130A, 130B and second curvilinear sections 140A, 140B. Specifically, a shorter flexure 100 or a flexure 100 in which the radius of curvature for the first curvilinear sections 130A, 130B and second curvilinear sections 140A, 140B is increased will generally have more compliance to rotation about the z-axis than a taller flexure 100 or one in which the radius of curvature for the first curvilinear sections 130A, 130B and second curvilinear sections 140A, 140B is decreased.

Figure 2:
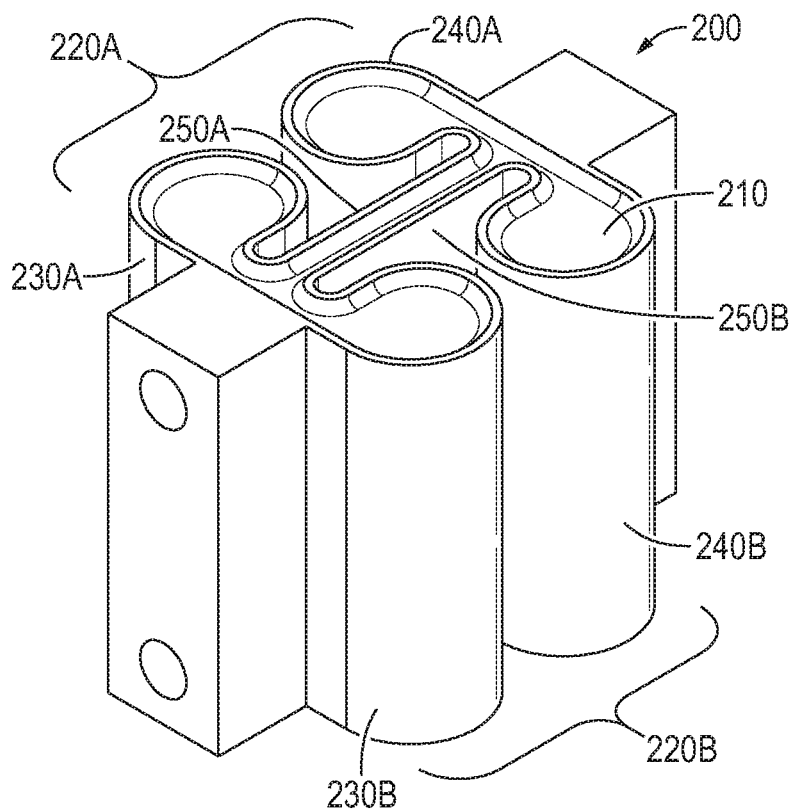
FIG. 2 is a 3D rendering of a six degrees of freedom flexure with potting material in accordance with one or more embodiments of the present invention.

While the flexure 100 illustrated in FIG. 1 provides tunability in six degrees of freedom, the characteristics of the flexure 100 may be further tuned by adding other elements. For example, FIG. 2, which is a 3D rendering of a six degrees of freedom flexure 200, in accordance with one or more embodiments of the present invention, illustrates another method of tuning the characteristics of the flexure 200. In this embodiment, potting material 210, for example, a visco-elastic material, is placed within the flexure 200. Depending on the properties of the potting material 210, it may reduce the transmission of vibrations from one side to the other of the flexure 200. The potting material 210 may also be used to increase constraint of the flexure 200. The degree of vibration reduction and constraint of the flexure 200 can be even further tuned by adjusting the depth and location of the potting material 210 within the flexure 200. The degree of vibration reduction and constraint of the flexure 200 can be additionally tuned by placing the potting material 210 between only a portion of the first and second beams 220A, 220B. For example, in at least one embodiment of the present invention, the potting material 210 is placed only between the straight arm sections 250A, 250B, while in another embodiment of the present invention, the potting material 210 is placed only between the first curvilinear sections 230A, 230B or second curvilinear sections 240A, 240B.

The flexure 100 of FIG. 1 provides a hard stop after a predetermined amount of motion. For example, once the flexure 100 has been compressed in the x-direction such that the straight arm sections 150A, 150B bottom out against the first and second mounting blocks 110A, 110B, the flexure 100 cannot be compressed further, thereby providing a hard stop. The flexure 100 also provides a hard stop when it has been extended in the x-direction such that the first curvilinear sections 130A, 130B, the second curvilinear sections 140A, 140B, and the straight arm sections 150A, 150B have been stretched straight and are now parallel to each other and to the x-axis. Similarly, the flexure 100 provides a hard stop when it has been offset in the y-direction such that the first curvilinear sections 130A, 130B, the second curvilinear sections 140A, 140B, and the straight arm sections 150A, 150B have been stretched straight and are now parallel to each other and are becoming parallel to the y-axis.

The flexure 100 of FIG. 1, in certain embodiments of the present invention, may provide preloading. Specifically, by using an asymmetric design, for example, where straight arm sections 150A and 150B are different lengths, tension can be built into the flexure 100. This tension can then be used beneficially to preload the element attached to one end of the flexure 100 relative to the element attached to the opposite end of the flexure 100. While this example would provide preload for rotation about the z-axis, the flexure 100 may be designed to provide preload with respect to the other five degrees of freedom, either independently or in any combination.

For some applications of the present invention, the flexures may need to be more compliant during assembly, but then more constrained during actual use. This may be implemented through the use, for example in some embodiments of the present invention, of temperature sensitive materials to form the flexures. Specifically, a material that is more compliant at elevated temperatures but becomes more constrained at room temperature may work for applications where the flexures can be heated during the assembly process.

Figure 3:
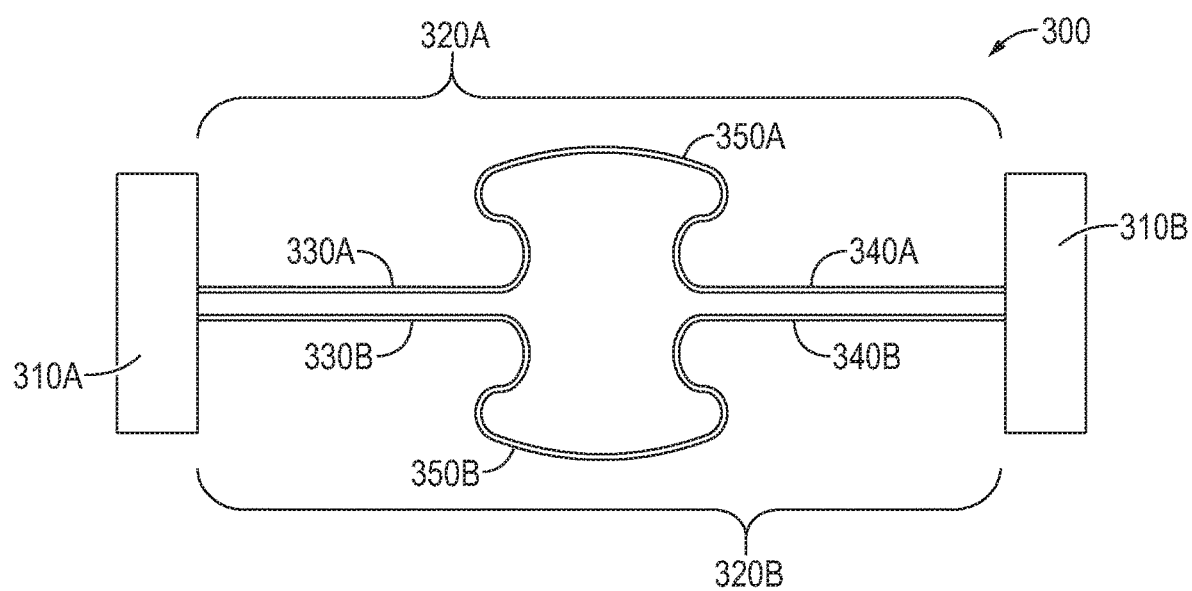
FIG. 3 illustrates a plan view of a six degrees of freedom flexure in accordance with one or more embodiments of the present invention.

While FIG. 1 illustrates a flexure 100 based upon first and second curvilinear sections 130A, 130B, 140A, 140B, and straight arm sections 150A, 150B, other physical implementations of the present invention are possible. As an example, FIG. 3 illustrates a plan view of another embodiment of the present invention in which the flexure 300 includes a first mounting block 310A and a second mounting block 310B. The first and second mounting blocks 310A, 310B are attached to each other via first and second beams 320A, 320B. While FIG. 3 shows the first and second beams 320A, 320B are symmetric, e.g., are mirror images of each other, in alternative embodiments of the present invention, the first and second beams 320A, 320B are not symmetric. This asymmetry provides a means for tuning the constraint and compliance in the six degrees of freedom of the flexure 300 or for providing preloading. The first and second beams 320A, 320B each include a corresponding first straight arm section 330A, 330B, and a corresponding second straight arm section 340A, 340B. The first straight arm sections 330A, 330B are connected to the second straight arm sections 340A, 340B via corresponding curvilinear sections 350A, 350B. As with flexure 100, the compliance and constraint of the six degrees of freedom of flexure 300 may be controlled through many of the same techniques, including similar changes in geometry and materials.

Figure 4:
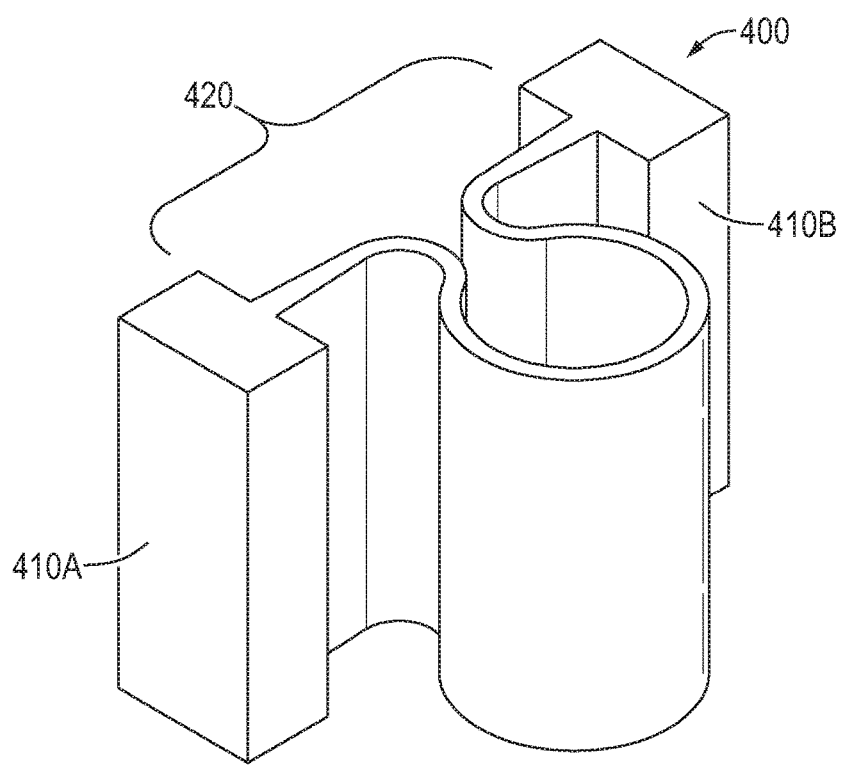
FIG. 4 is a 3D rendering of a six degrees of freedom flexure in accordance with one or more embodiments of the present invention.

As yet another example, FIG. 4 is a 3D rendering of a six degrees of freedom flexure 400, in accordance with one or more embodiments of the present invention. Flexure 400 includes a first mounting block 410A and a second mounting block 410B. The first and second mounting blocks 410A, 410B are attached to each other via a single beam 420.

Unlike the beams 120A, 120B, 320A, 320B used in flexures 100, 300, the single beam 420 does not have a constant cross-sectional area, as the area increases closer to the first and second mounting blocks 410A, 410B, i.e., the thickness of the beam 420 increases. While the cross-sectional area of the beam 420 varies in this embodiment of the present invention due to changes in the thickness of the beam 420, the cross-sectional area may be altered by other means for tuning purposes. For example, one or more slots, holes, or notches may be placed in the beam to increase compliance. Further, depending upon where the slot(s), hole(s), or notch (es) are placed, for example in a straight arm section, in a curvilinear section, or at the juncture of a straight arm section and a curvilinear section, one may tune different degrees of freedom.

The physical implementations of illustrated flexures 100, 300, 400 are exemplary only and not intended to limit the scope of the physical implementation of any embodiment of the present invention. For example, while flexure 100 and flexure 300 employ two beams 120A, 120B, 320A, 320B, and flexure 400 employs a single beam 420, other embodiments of the present invention may employ three or more beams. As another example, while flexures 100, 300 employ two beams 120A, 120B, 320A, 320B, that are mirror images of each other, other embodiments of the present invention may employ identical beams.

Further, while the illustrated flexures 100, 300, 400 employ sections in the form of straight arm sections 150A, 150B, 440A, 330B, 340A, 340B and curvilinear sections 130A, 130B, 140A, 140B, 350A, 350B, other geometric sections may be employed in other embodiments of the present invention. For example, an angle section may join two straight arm sections, for example, at 45° or 90°, rather than with a curvilinear section. Other potential geometric sections include ball-and-sockets, hinges, or springs, which may be used, for example, to join two straight arm sections. Similarly, while the illustrated flexures 100, 300, 400 employ straight arm sections 150A, 150B, 330A, 330B, 340A, 340B and curvilinear sections 130A, 130B, 140A, 140B, 350A, 350B, having rectangular cross-sectional shapes, other cross-sectional shapes may be employed in other embodiments of the present invention. For example, straight arm sections and curvilinear sections may have circular or elliptical cross-sectional shapes. Other potential cross-sectional shapes include rectangles, circles, and ellipses that are hollowed out, for example to provide an additional method to tune compliance or to reduce weight.

The various embodiments of the flexures have various potential uses in the aerospace, medical device, manufacturing, and automotive industries. For example, a number of medical devices employ titanium pieces that must move with respect to one another, for example, replacement knee or hip joints. Through the use of various embodiments of the present invention, the six degrees of freedom movement between the various pieces can be tuned as desired.

Figure 5A:
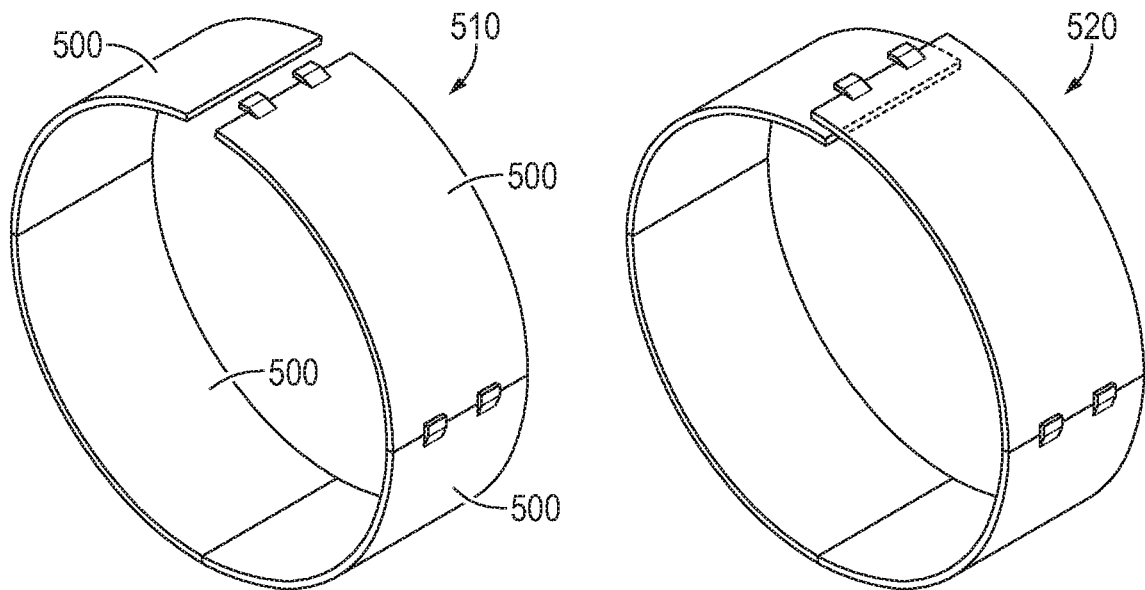
FIG. 5A illustrates fabrication issues in the prior art due to over-constraint.
Figure 5B:
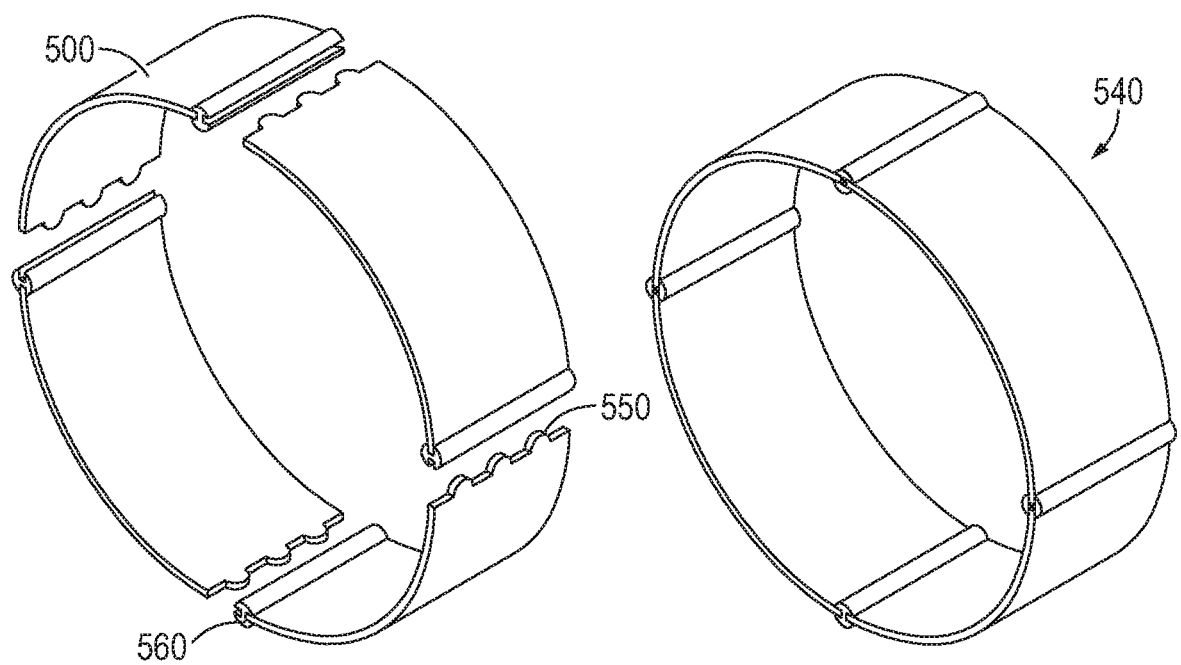
FIG. 5B illustrates the same application as FIG. 5A but employs six degrees of freedom flexures in accordance with one or more embodiments of the present invention.

Appropriately designed flexures can be used to solve the over-constraint problem, especially for larger assemblies. As an example, a company manufacturing tanks may build the tanks as a series of hoops, with each hoop being formed of multiple panels. As shown in FIG. 5A, if the panels 500 are not assembled correctly due to over-constraint, the panels 500 will not form a full 360°, but may form a 355° trough 510 or a 365° overlapped hoop 520. By using flexures 550, the panels 500 will consistently form the desired 360° hoop 540, as shown in FIG. 5B. After assembling the panels 500 to form the desired 360° hoop 540, the seams between the panels 500 caused by the flexures 550 can be sealed by a sealant 560 to make the hoop 540 liquid- or gas-tight.

Over-constraint can be an even more challenging problem when autonomous assembly is used for real systems. Real systems, as opposed to the virtual systems developed on a computer during the design stage, are subject to manufacturing tolerances, inspection tolerances, differential thermal growth, and other sources of error. These errors can present tremendous difficulty when autonomously assembling systems. The solution, as found in various embodiments of the present invention, is to employ six degrees of freedom flexures at the interfaces.

By adding compliance in all six degrees of freedom at the interfaces, various embodiments of the present invention allow assembly of arrays of panels without over-constraint. This is especially helpful when assembling autonomously or assembling remotely. Through careful design of the flexures, compliance and constraint can be meticulously controlled to ensure that the assemblies are still stiff enough to perform their function.

Figure 6:
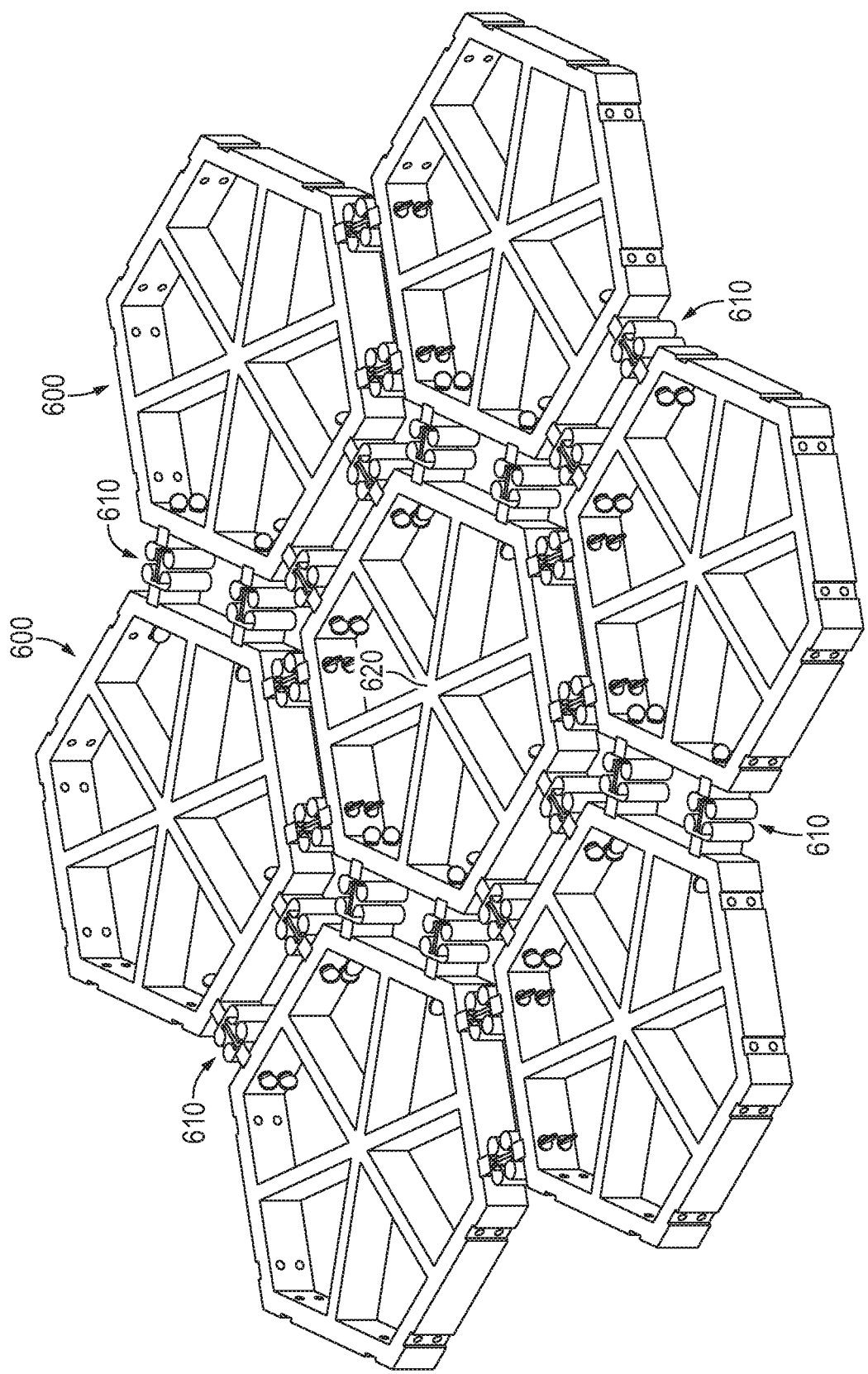
FIG. 6 illustrates an array of panels assembled using six degrees of freedom flexures in accordance with one or more embodiments of the present invention.

FIG. 6 illustrates an array of panels 600 assembled using six degrees of freedom flexures 610 in accordance with an embodiment of the present invention. As illustrated, a center panel 620 is connected to its six adjacent panels 600 via two flexures 610 on each of its six sides. As will be appreciated by one of skill in the art, the amount of compliance and constraint between the panels 600 can be controlled by the design of the flexures 610 and the number of flexures 610 used to connect adjacent panels 600. If a similar array of panels were assembled using rigid fasteners, for example bolts and nuts, it is highly likely that over-constraint would be an issue as getting all seven panels to align perfectly would be difficult. While the array of panels 600 employ panels 600 having a hexagonal shape, other shapes may be employed to build a solid array of panels. Alternative panel shapes include, for example, equilateral triangles and rhombuses.

Figure 7A:
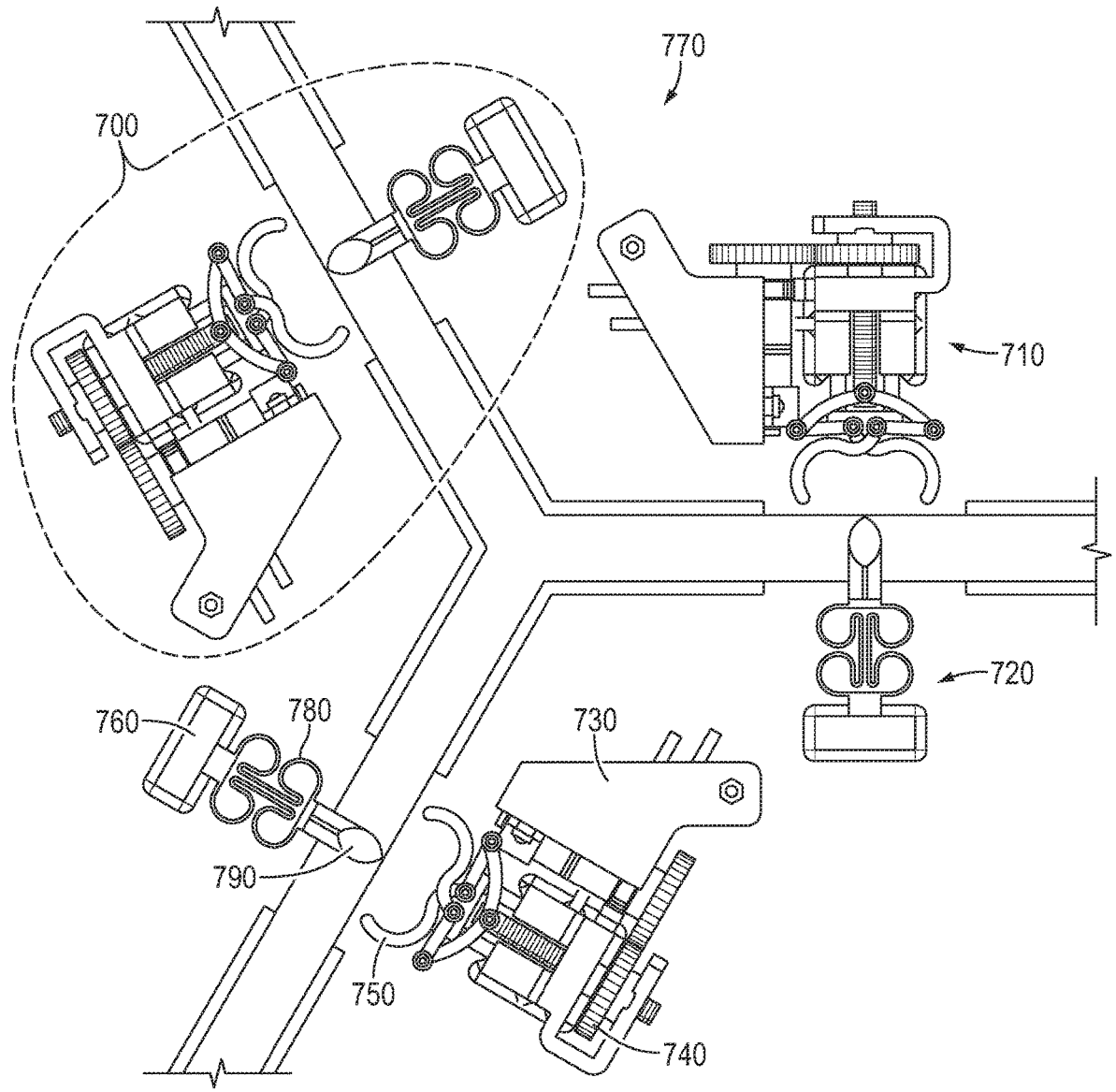
FIGS. 7A-7C illustrate a coupling mechanism and its corresponding motions in accordance with one or more embodiments of the present invention that may be employed for autonomous assembly of an array of panels.
Figure 7B:
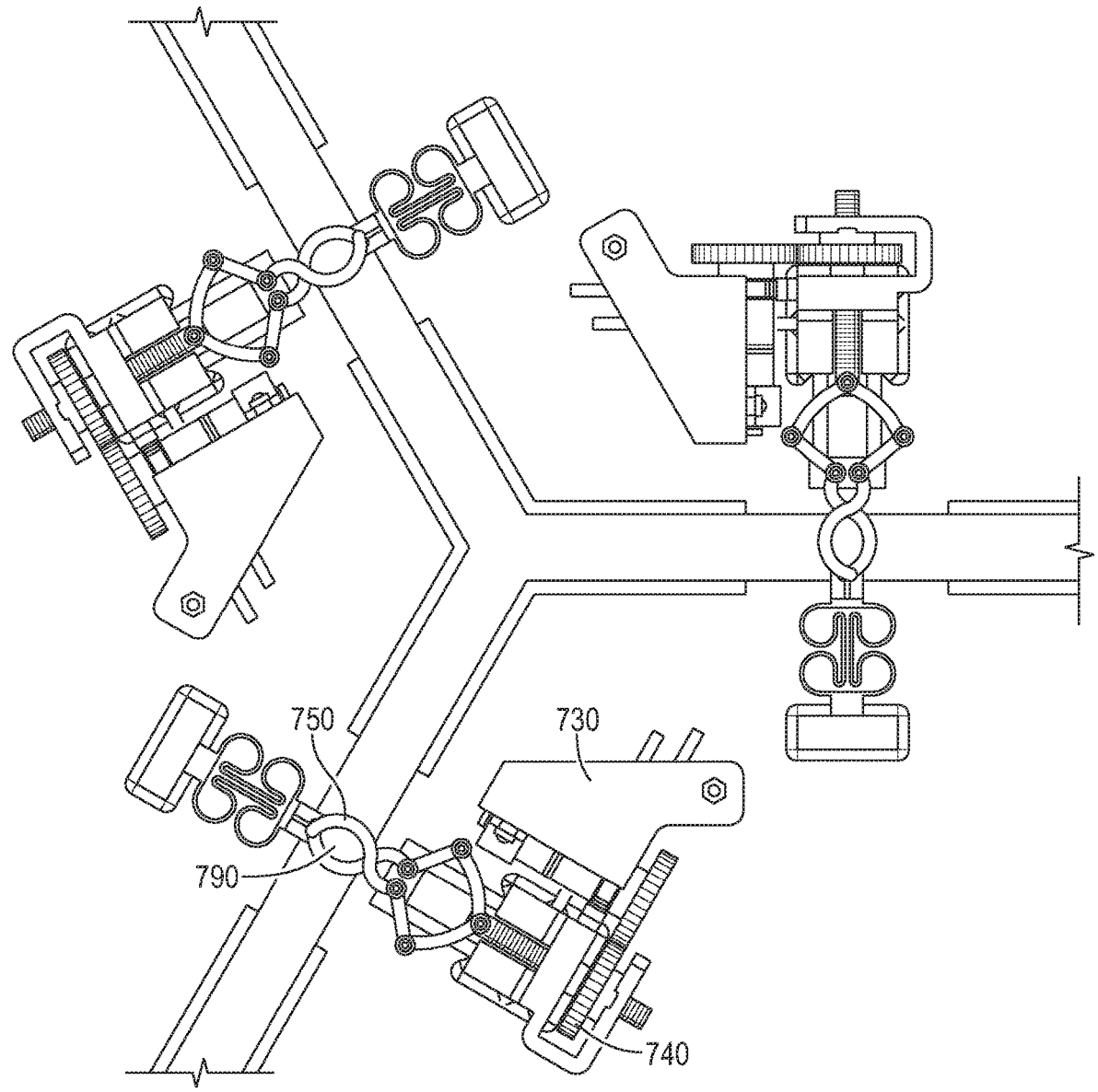
Figure 7C:
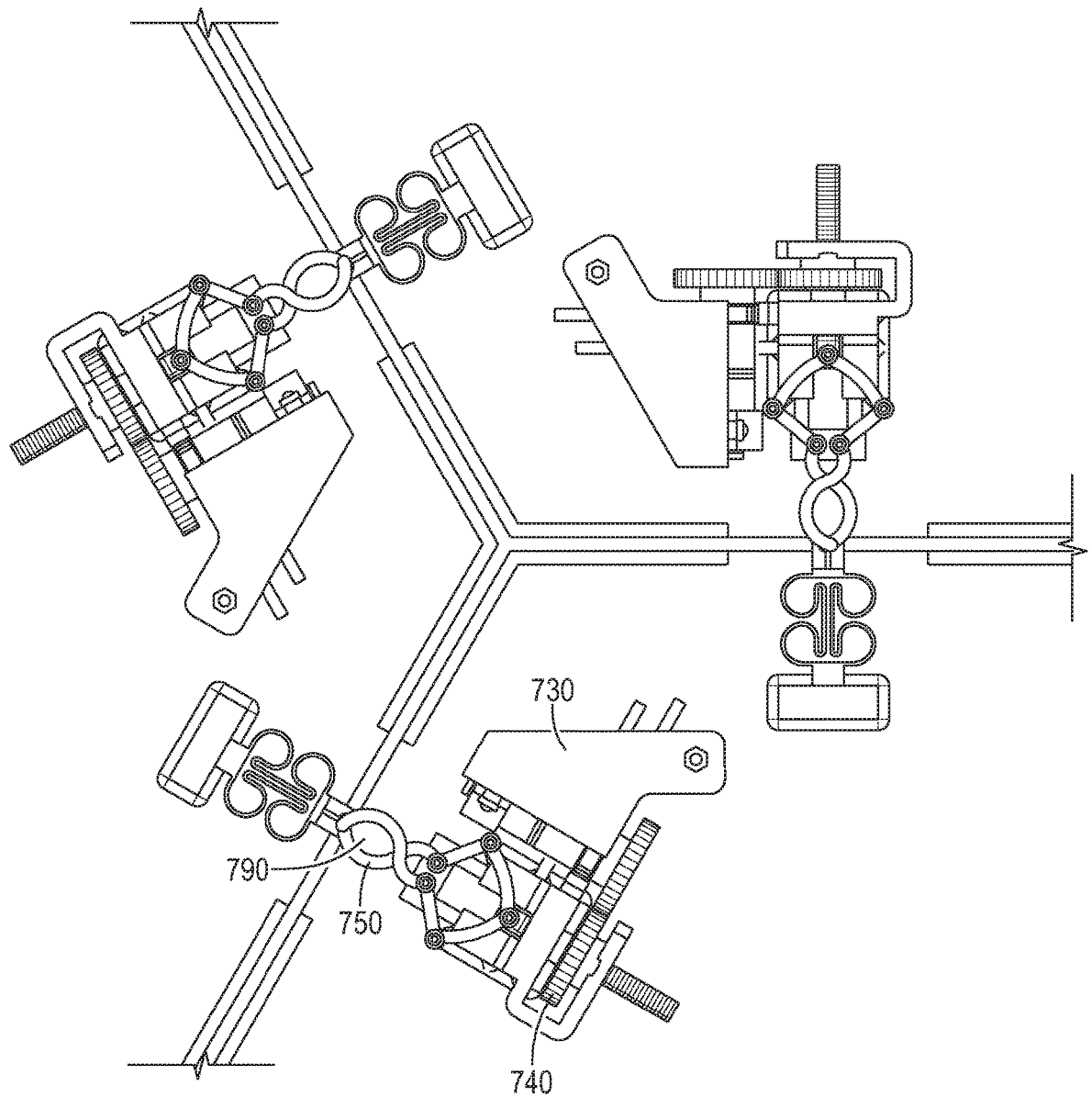

An embodiment of the present invention that may be employed for autonomous assembly of an array of panels is illustrated in FIGS. 7A-7C. As shown in FIG. 7A, each of the three coupling mechanisms 700 has two primary components, a motor-driven grip 710 and a coupler 720. The grip 710 includes a motor 730, a corresponding gear drive 740, and a jaw 750. The coupler 720 includes a support bracket 760 mounted to one of the panels 770 being attached, a six degrees of freedom flexure 780 attached to the support bracket 760 at one end and attached to a handle 790 at the other end. In this embodiment of the present invention, the handle 790 preferably has a football-shaped cross-section to simplify alignment during the autonomous assembly process.

To start the autonomous assembly process, a command signal is sent to the motor 730 causing the motor 730 to rotate. This rotation of the motor 730 rotates the gear drive 740, causing the jaw 750 to extend and engage the handle 790, as shown in FIG. 7B. Continued rotation of the motor 730 draws the panels 770 together and into alignment, as shown in FIG. 7C. Rotation of the motor 730 ends at a predetermined point when the correct separation and alignment of the panels 770 is achieved. Because of the compliance of the automated assembly process using the flexures 780, the individual panels 770 need only be coarsely aligned prior to starting the autonomous assembly process. This compliance thereby reduces demands on a robotic manipulator and greatly simplifies the autonomous assembly of large and/or numerous panels 770 as using jigs for accurate alignment of the panels 770 may not be feasible in remote locations. The use of panels 770 having a preferred hexagonal shape further simplifies this autonomous assembly process.

In a remote application, the panels 770 may, for example, be solar panels. In this application, the grip 710 and coupler 720 may need to serve other functions. For example, the grip 710 and coupler 720 may need to enable the transfer of solar generated power from one panel 770 to the next panel 770, and ultimately back to the end user (not illustrated). To implement this power transfer function, the grip 710 and coupler 720 may, for example, include electrical cabling and corresponding electrical couplers (not illustrated) such that the electrical couplers are mated when the jaw 750 engages the handle 790.

While the electrical cabling and corresponding electrical couplers may be used to transfer solar generated power to the end user, the electrical cabling and corresponding electrical couplers may also carry control and data signals between the end user and the panels 770. In an alternative embodiment of the present invention, a fiber optic connection having one or more optical fibers may carry the control and data signals. As with the electrical cabling and corresponding electrical couplers embodiment of the present invention, the optical fiber embodiment of the present invention would have fiber optic connectors built into the grip 710 and coupler 720. The fiber optic connectors from each panel 770 are brought into alignment when the jaw 750 engages the handle 790. Some embodiments of the present invention may employ a combination of electrical cabling and corresponding electrical couplers in conjunction with optical fibers and corresponding fiber optic connectors.

While the grip 710 illustrated in FIG. 7 is driven by the motor 730, other embodiments of the present invention are possible. For example, the grip 710 may be spring-loaded, such that the grip 710 acts like a trap with respect to the coupler 720. When the spring is released, the jaw 750 engages the handle 790. In another embodiment of the present invention, the grip 710 is manually operated by an assembler. Both of these embodiments, like the embodiment illustrated in FIG. 7, enjoy the benefit of the six degrees of freedom in the flexure 780 to overcome the potential problems associated with assembly using an over-constrained system.

Figure 8A:
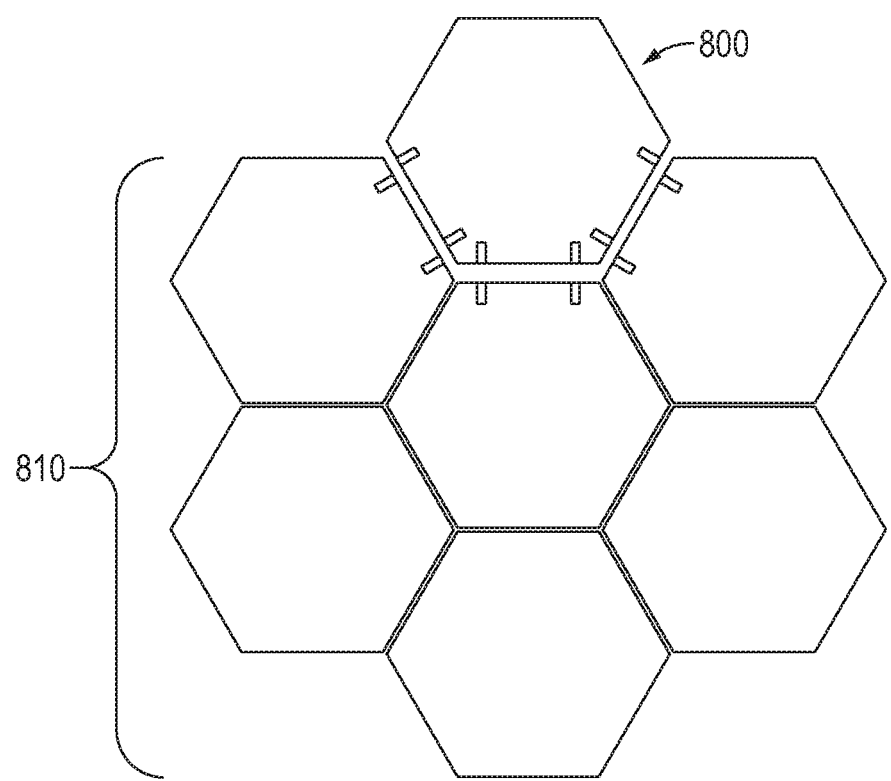
FIGS. 8A-8D illustrate the steps of an assembly process in accordance with one or more embodiments of the present invention that may be employed for autonomous assembly of an array of panels.
Figure 8B:
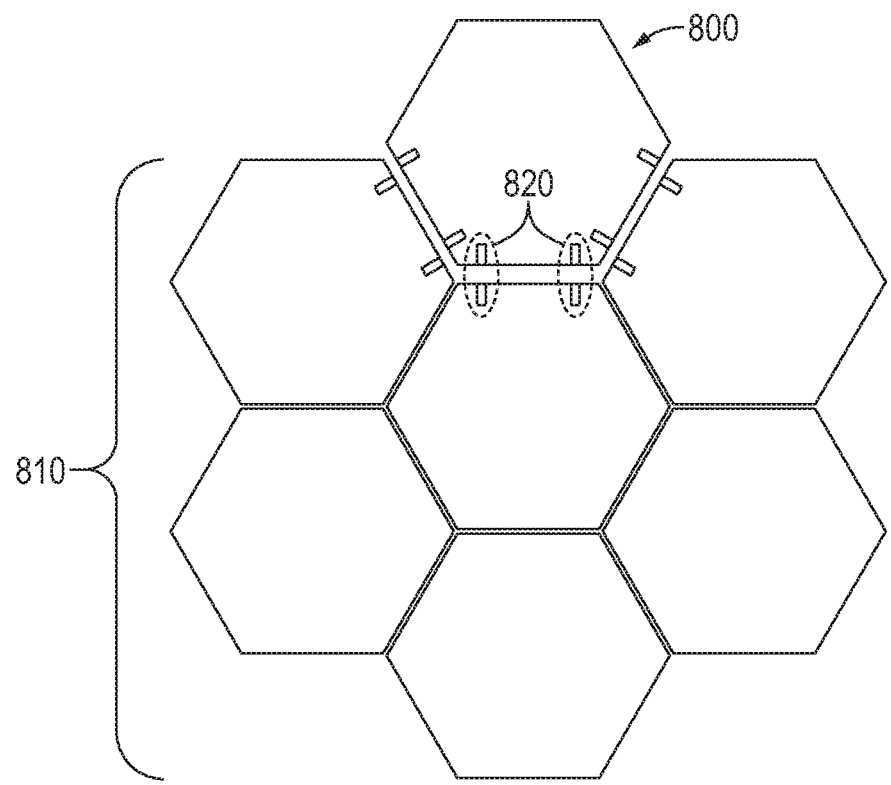
Figure 8C:
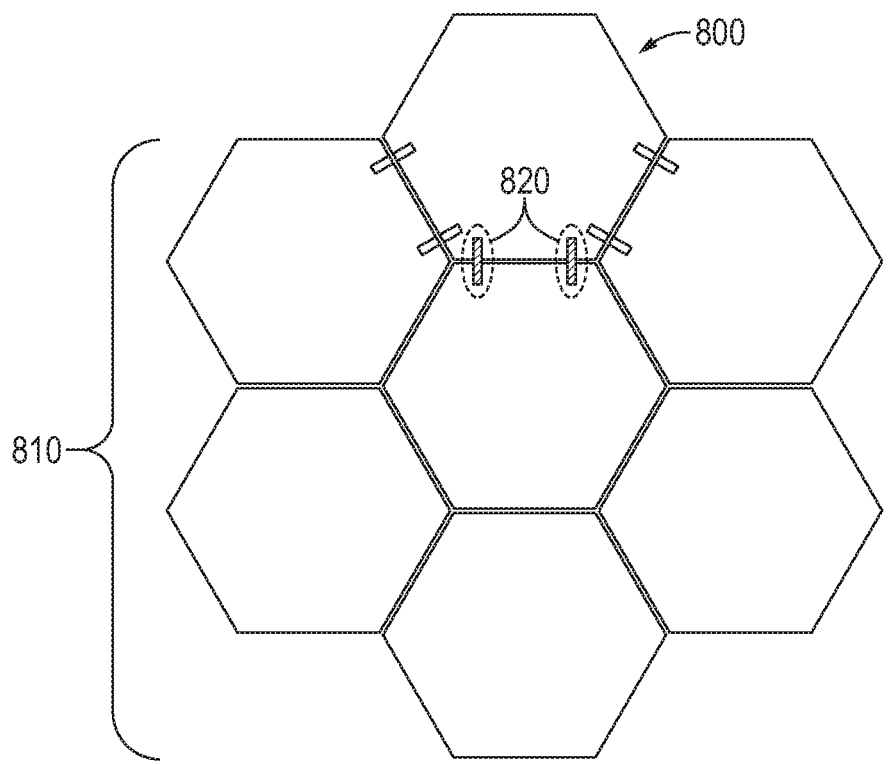
Figure 8D:
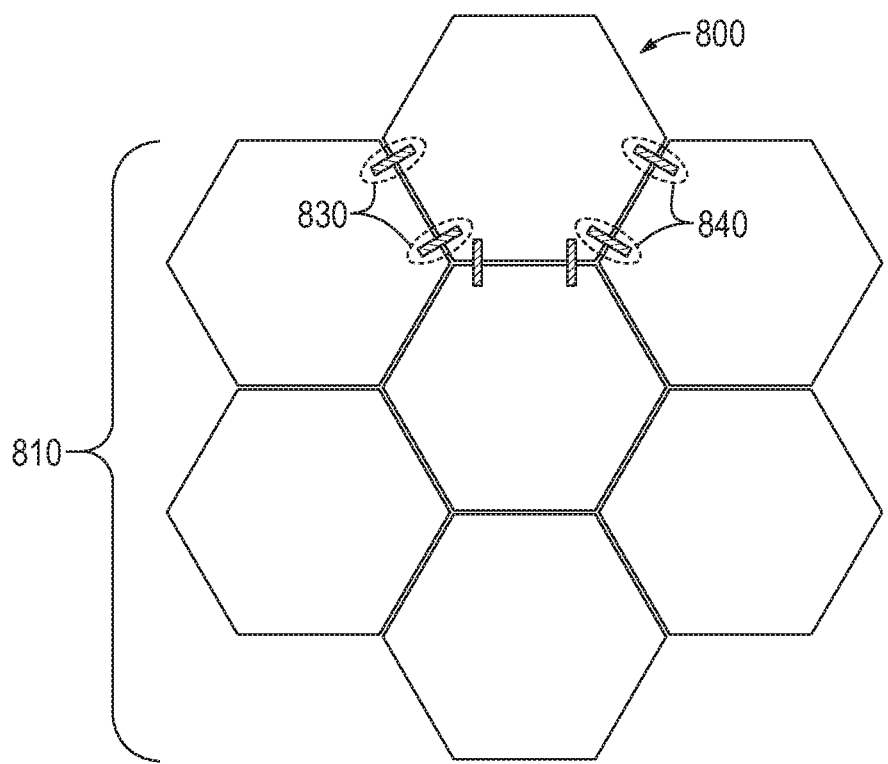

FIGS. 8A-8D illustrate the steps in adding a new panel 800 to an existing array of panels 810. In the first step, as illustrated in FIG. 8A, the new panel 800 is placed in close proximity to the desired final position. Due to the assembly process and the compliance of the coupling mechanisms, the new panel 800 need not be precisely located as the coupling mechanisms will draw the new panel 800 into its correct final position. For example, the new panel 800 may be placed with an initial gap, e.g., 20 mm±5 mm, next to the existing array of panels 810. In the second step, as illustrated in FIG. 8B, the first pair of coupling mechanisms 820 on a first side of the new panel 800 engage with a corresponding pair of coupling mechanisms of the existing array of panels 810. At this point, an assembler or robotic manipulator may release the new panel 800. In the third step, illustrated in FIG. 8C, the engaged pairs of coupling mechanisms 820 draw the new panel 800 into position, while simultaneously aligning two additional sides of the new panel 800 with the existing array of panels 810. In the fourth step, as illustrated in FIG. 8D, the pairs of coupling mechanisms 830, 840 on the two additional sides of the new panel 800 engage with corresponding pairs of coupling mechanisms of the existing array of panels 810 and finish drawing the new panel 800 into its final position with respect to the existing array of panels 810.

Figure 9A:
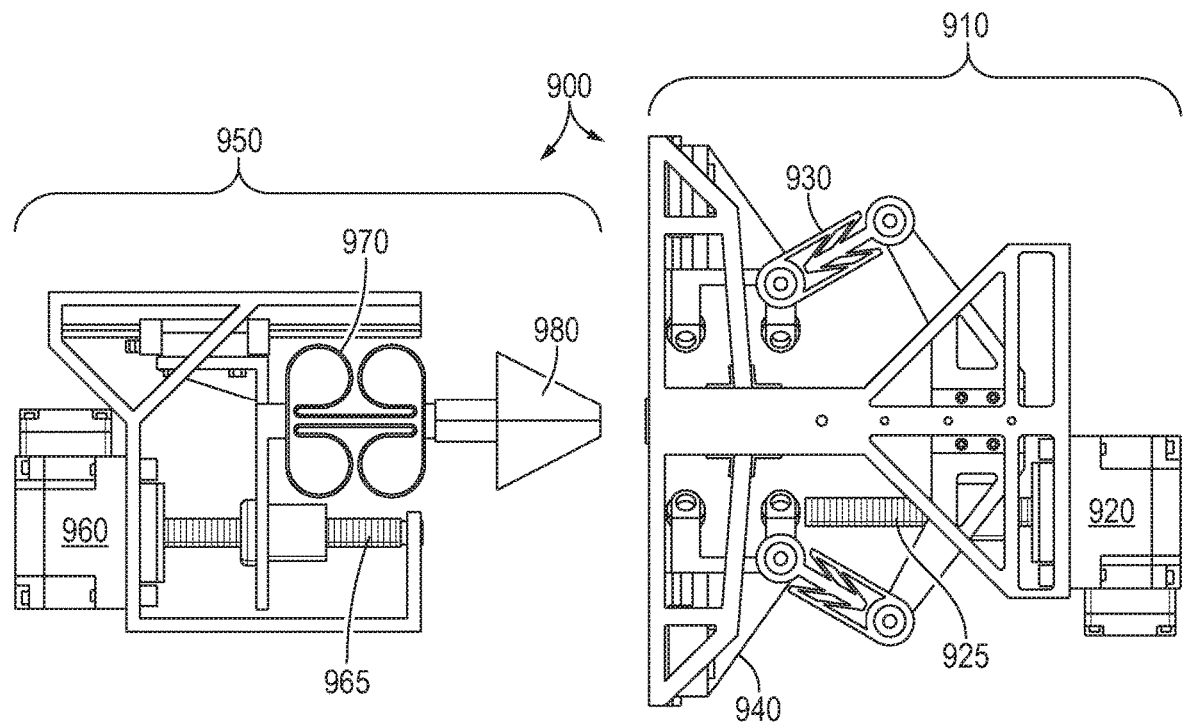
FIGS. 9A-9F illustrate a coupling mechanism and its corresponding motions in accordance with one or more embodiments of the present invention that may be employed for autonomous assembly of an array of panels.
Figure 9B:
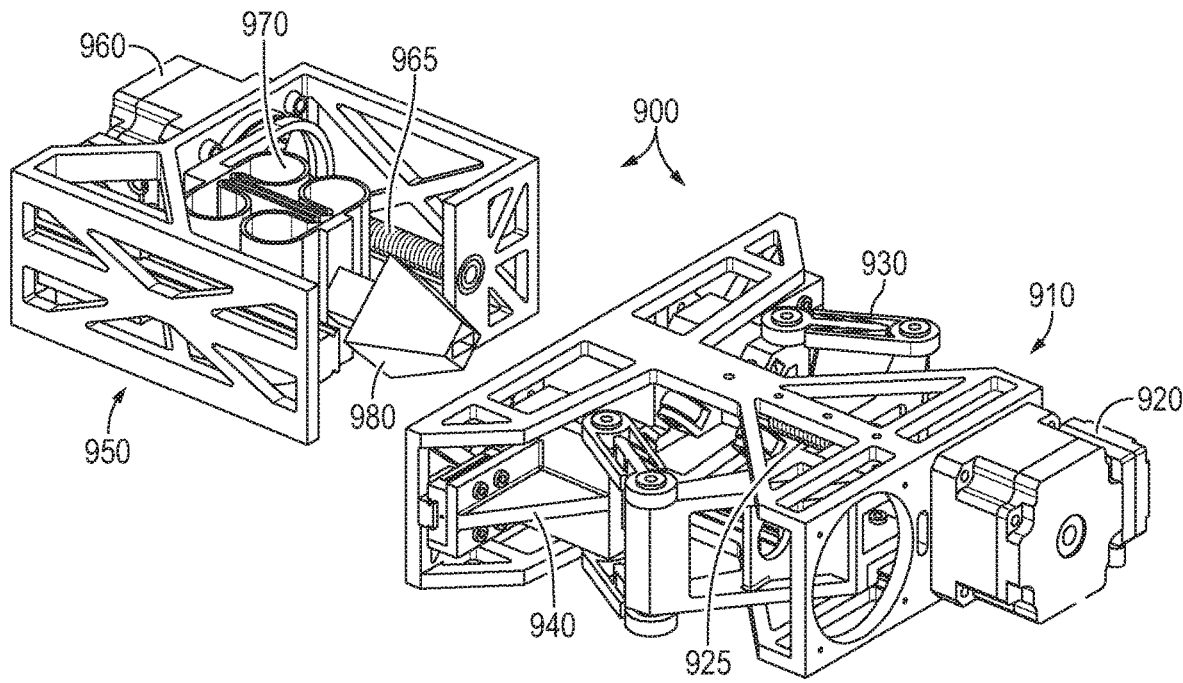

FIGS. 9A-9F illustrate a coupling mechanism 900 in accordance with one or more embodiments of the present invention and its motions that may be employed for autonomous assembly of arrays of panels. As shown in FIG. 9A, the coupling mechanism 900 has two primary components, a motor-driven grip 910 and a motor-driven coupler 950. The grip 910 includes a motor 920, a gear drive 925, a set of actuation arms 930, and at least one clamp 940 (the illustrated embodiment includes two clamps 940). The coupler 950 includes a motor 960, a gear drive 965, a six degrees of freedom flexure 970, and a handle 980. FIG. 9B is a 3D rendering of the coupling mechanism 900 illustrated in FIG. 9A.

Figure 9C:
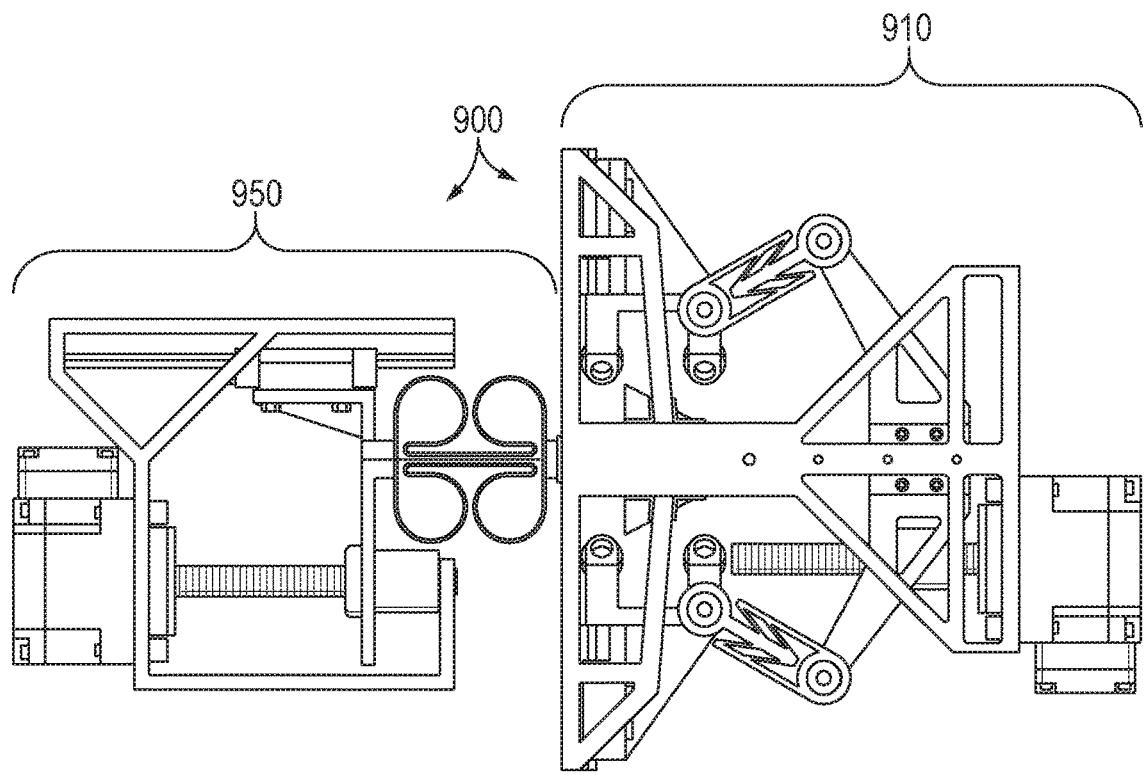
Figure 9D:
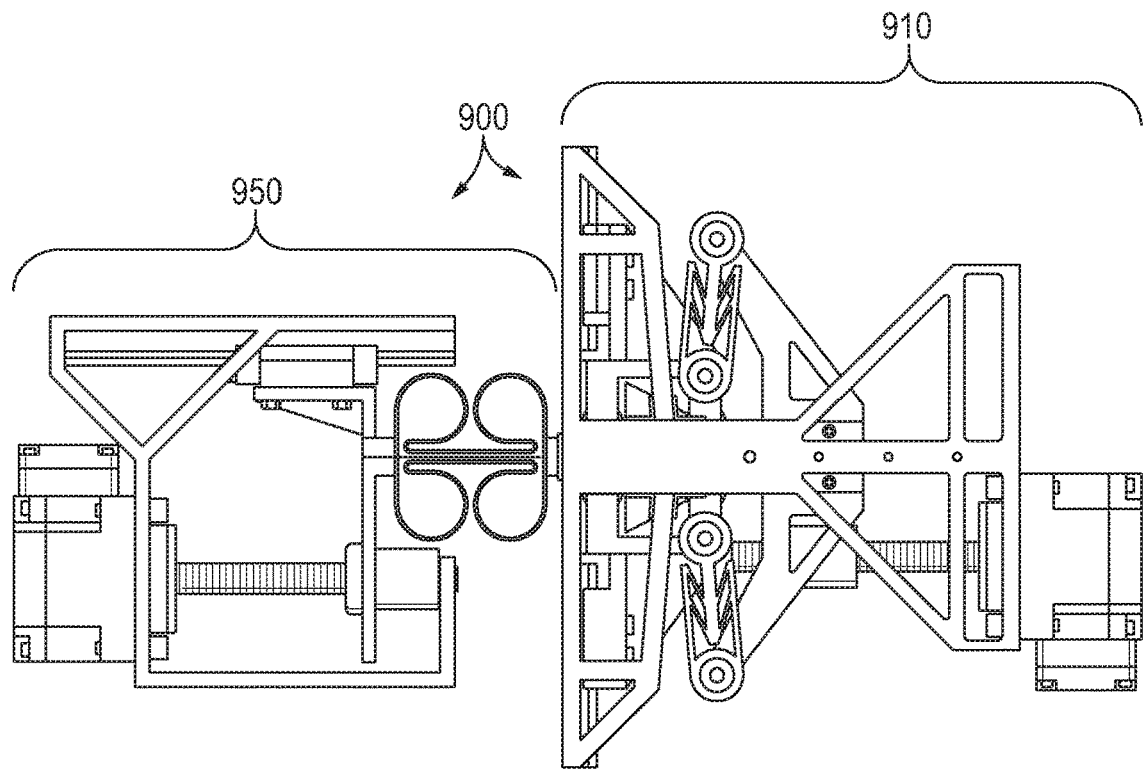
Figure 9E:
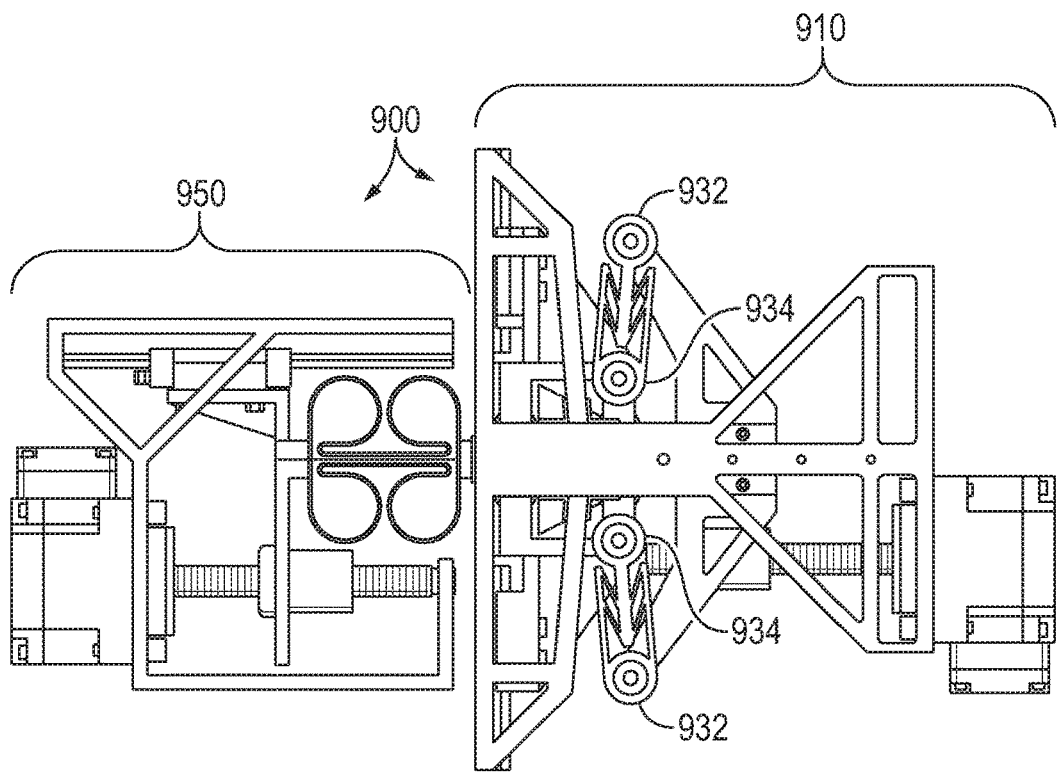

In FIG. 9C, the handle 980 of the coupler 950 has been extended by the motor 960 into the grip 910. In FIG. 9D, the clamps 940 have closed around the handle 980 due to operation of the motor 910 and the set of actuation arms 930. In FIG. 9E, the handle 980 of the coupler 950 has been retracted by the motor 960, thereby setting the final spacing between the grip 910 and the coupler 950, and thus the spacing between the grip and handle panels (not illustrated) to which the grip 910 and the coupler 950 are attached, respectively.

Figure 9F:
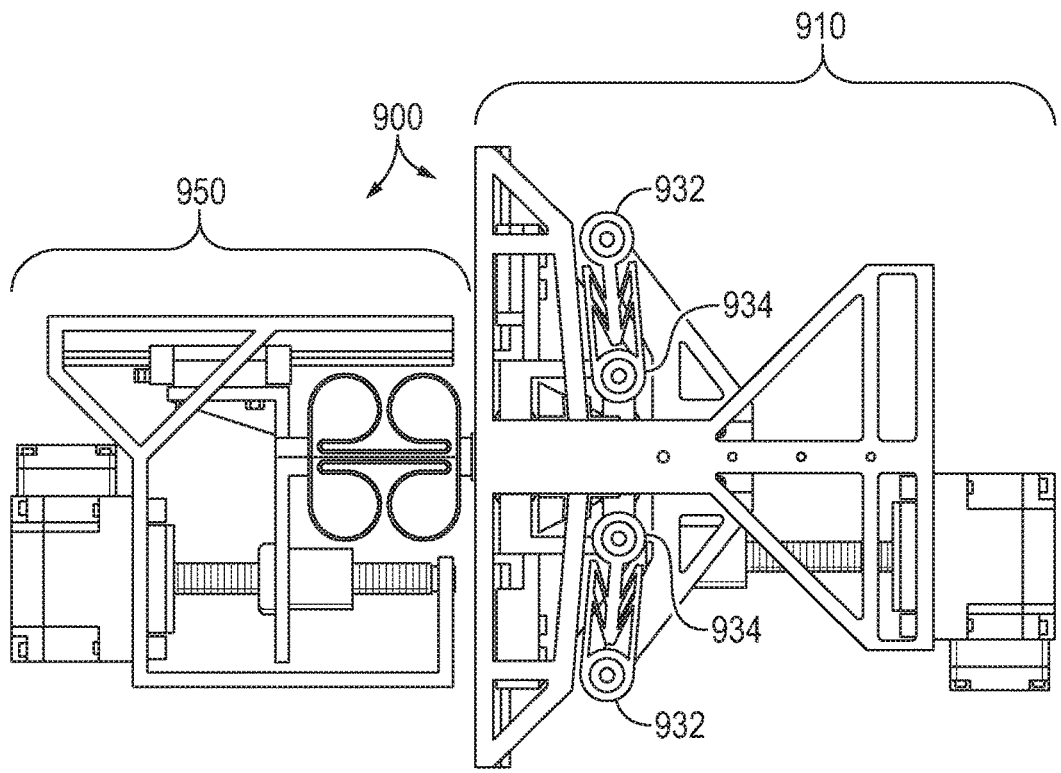

In FIG. 9F, the actuation arms 930 advance to lock the grip 910 and the coupler 950 into position, thereby locking the relative positions of the grip and handle panels (not illustrated) to which the grip 910 and the coupler 950 are attached, respectively. This advancing of the actuation arms 930 causes the actuation arms 930 to over-center the clamps 940. This over-centering is clear when one compares the location of outer-most pivot points 932 of the actuation arms 930 with the location of the inner-most pivot points 934 of the actuation arms 930 in FIGS. 9E and 9F. In FIG. 9E, the outer-most pivot points 932 are to the right of the inner-most pivot points 934, while in FIG. 9F, the outer-most pivot points 932 are to the left of the inner-most pivot points 934. This over-centering provides the benefit that any motion of the handle 980 relative to the clamps 940 actually increases the clamping force of the clamps 940 on the handle 980. As the grip 910 and coupler 950 are attached to panels (not illustrated), the end result is that any relative motion between the panels is translated to the grip 910 and coupler 950, thereby increasing the clamping force of the clamps 940 on the handle 980 and inhibiting any further relative motion between the panels.

By advancing the actuation arms 930 as shown in FIG. 9F, any electrical couplers or fiber optic connectors in the grip 910 and coupler 950 are also mated. The now mated electrical couplers or fiber optic connectors allow the transmission of power and control/data signals between the grip and handle panels (not illustrated) to which the grip 910 and the coupler 950 are attached, respectively.

In some embodiments of the present invention, the coupling mechanism 900 illustrated in FIGS. 9A-9F includes one or more additional six degrees of freedom flexures. In some of these embodiments, the grip 910 is attached to its corresponding grip panel with a six degrees of freedom flexure. In yet other embodiments of the present invention, the coupling mechanism 900 illustrated in FIGS. 9A-9F includes a six degrees of freedom flexure used to attach the coupler 950 to its corresponding handle panel.

Figure 10E:
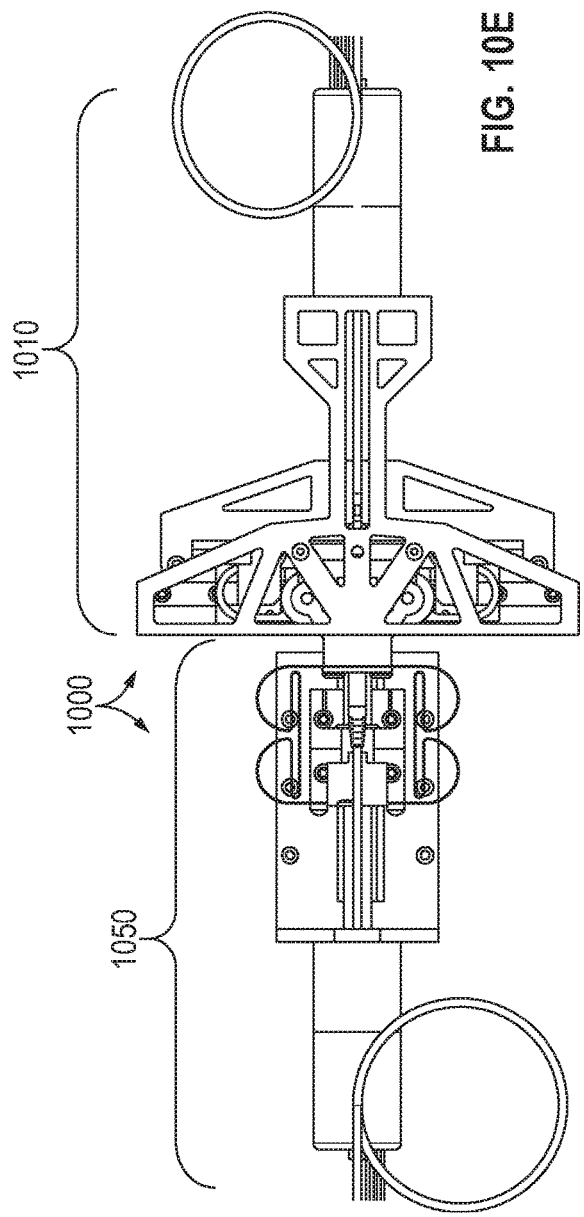

FIGS. 10A-10F illustrate a coupling mechanism 1000 in accordance with one or more embodiments of the present invention and its motions that may be employed for autonomous assembly of arrays of panels. As shown in FIG. 10A, the coupling mechanism 1000 has two primary components, a motor-driven grip 1010 and a motor-driven coupler 1050. The grip 1010 includes a motor 1020, a corresponding motor controller signal cable 1022, a gear drive 1025, a set of actuation arms 1030, at least one clamp 1035 (the illustrated embodiment includes two clamps 1035) within a housing 1040, and an electrical coupler or fiber optic cable 1045. The coupler 1050 includes a motor 1060, a corresponding motor control signal cable 1062, a gear drive 1065, a six degrees of freedom flexure 1070, a handle 1080, and an electrical coupler or fiber optic cable 1090.

In FIG. 10B, the handle 1080 of the coupler 1050 has been extended by the motor 1060 into the clamps 1035 of the grip 1010. In FIG. 10C, the clamps 1035 have closed around the handle 1080 due to operation of the motor 1010 and the set of actuation arms 1030. In FIG. 10D, the motor 1020 continues to advance the actuation arms 1030, causing the actuation arms 1030 to over-center the clamps 1035, resulting in the over-centering benefits described above. During this step, the electrical coupler or fiber optic connector 1045 in the grip 1010 and the electrical coupler or fiber optic connector 1090 in the coupler 1050 are also mated. The now mated electrical couplers or fiber optic connectors 1045, 1090 allow the transmission of power and control/data signals between the grip and handle panels (not illustrated) to which the grip 1010 and the coupler 1050 are attached, respectively. FIG. 10E shows that the motor 1060 in the coupler 1050 retracts, thereby setting the final spacing between the grip 1010 and the coupler 1050, and thus the spacing between the grip and handle panels (not illustrated) to which the grip 1010 and the coupler 1050 are attached, respectively.

Figure 10F:
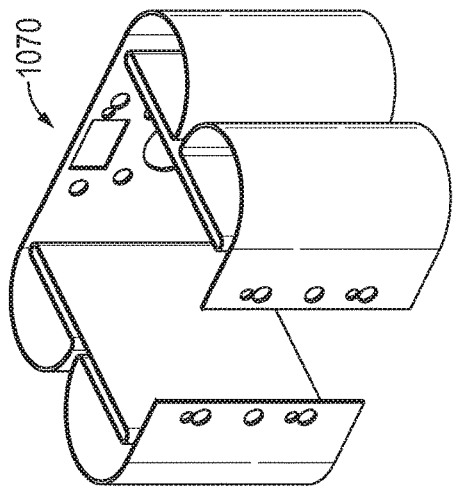

FIG. 10F illustrates a plan view and a 3D rendering of the six degrees of freedom flexure 1070. The six degrees of freedom flexure 1070 in this embodiment offers several advantages over the design of the coupling mechanism 900. In particular, the six degrees of freedom flexure 1070 protects portions of the gear drive 1065 and the electrical coupler or fiber optic cable 1090 and does so in a more compact manner. Further, due to its open design, the six degrees of freedom flexure 1070 can more readily be formed using traditional manufacturing methods.

Figure 11A:
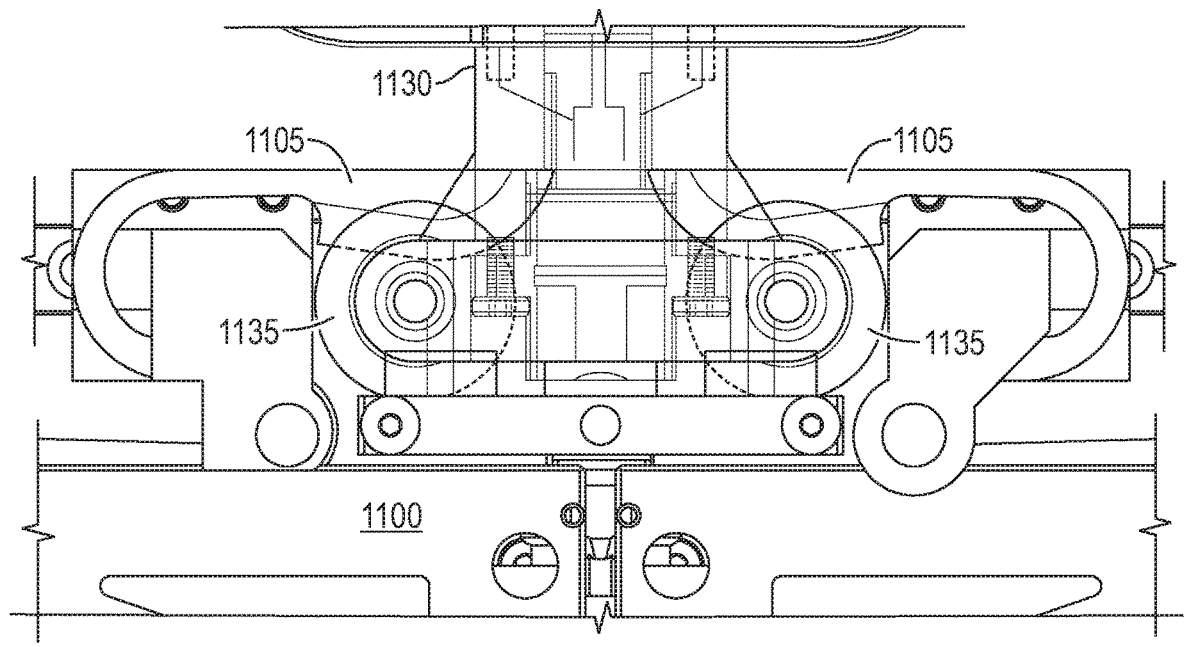
FIGS. 11A-11B illustrate a coupling mechanism employing a first type of self-aligning features in accordance with one or more embodiments of the present invention.
Figure 11B:
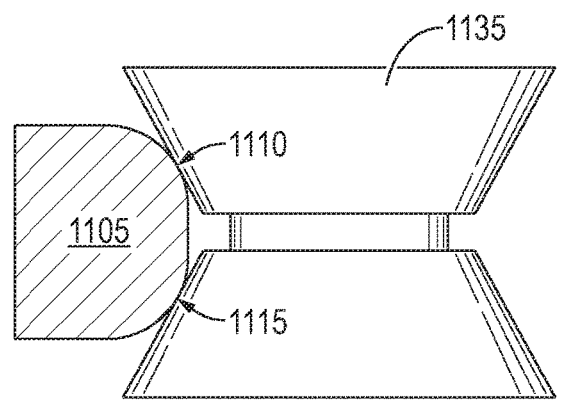

While the use of six degrees of freedom flexures aids the assembly of elements by reducing the over constraint issue, some level of alignment between the elements is generally required. To this end, a coupling mechanism may include one or more self-aligning features or elements. For example, FIG. 11A illustrates a plan view of a grip 1100 and a coupler 1130 employing a first type of self-aligning features, such as might be included with the grip 1010 and coupler 1050 illustrated in FIG. 10. The grip 1100 includes two clamps 1105 that are spring loaded to provide preloading when they engage two corresponding V groove rollers 1135 that are part of the coupler 1130. The faces of the two clamps 1105 are rounded such that when the faces engage the V groove rollers 1135, a first point (or line) of contact 1110 is formed between an upper portion of the rounded face of the clamp 1105 and an upper half of the V in the V groove roller 1135, while a second point (or line) of contact 1115 is formed between a lower portion of the rounded face of the clamp 1105 and a lower half of the V in the V groove roller 1135. This engagement is illustrated in cross-sectional FIG. 11B.

Figure 11C:
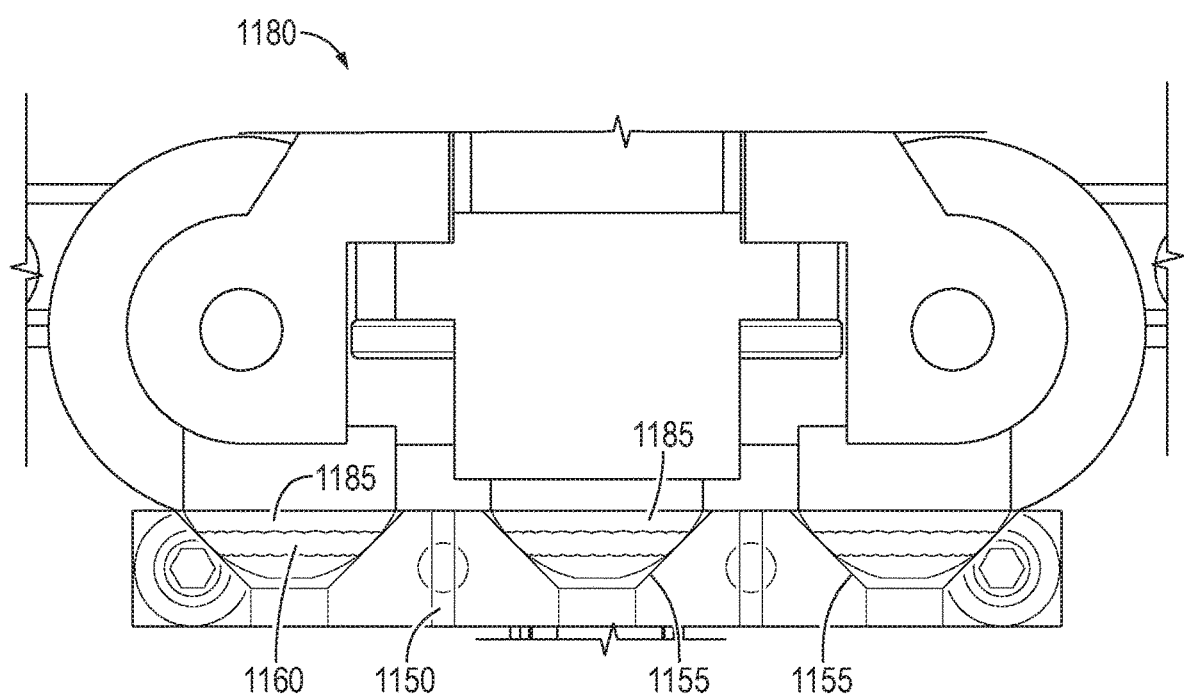
FIG. 11C illustrates a coupling mechanism employing a second type of self-aligning features in accordance with one or more embodiments of the present invention.

FIG. 11C illustrates another type of self-aligning features, generally known as a kinematic interface, such as might be included with the grip 1010 and coupler 1050 illustrated in FIG. 10. In FIG. 11C, a grip 1150 includes one or more flat-bottom cone-shaped sockets 1155. The embodiment illustrated in FIG. 11C employs three flat-bottom cone-shaped sockets 1155 arranged to form a triangle with one of the flat-bottom cone-shaped sockets 1155 at each vertex of the triangle. The coupler 1180 includes one or more hemispheres 1185. The embodiment illustrated in FIG. 11C employs three hemispheres 1185, again arranged to form a triangle with one of the hemispheres 1185 at each vertex of the triangle. Each of the hemispheres 1185 engages a corresponding one of the flat-bottom cone-shaped sockets 1155, resulting in a ring-shaped line of contact 1160 between the hemispheres 1185 and their corresponding flat-bottom cone-shaped sockets 1155.

The types of self-aligning features just disclosed are but two of the many different types of self-aligning features that may be used with a coupling mechanism. Further, a coupling mechanism may employ two or more types of self-aligning features simultaneously. For example, a coupling mechanism may use the clamp 1105 and V groove roller 1135 design illustrated in FIGS. 11A and 11B to provide a relatively course degree of initial alignment. Once the coupling mechanism is coarsely aligned, the kinematic interface illustrated in FIG. 11C, with its hemispheres 1185 and corresponding flat-bottom cone-shaped sockets 1155, may be used to provide a relatively fine degree of alignment for the coupling mechanism.

The various embodiments of the coupling mechanisms have various potential uses. For example, telescopes, whether optical or radio, may employ an array of panels to create a larger receiving or reflective surface or to correct for optical or radio disturbances in the atmosphere. Coupling mechanisms in accordance with one or more embodiments of the present invention may be used for joining these optical or radio panels while ensuring correct alignment, including potentially correcting for thermal expansion of the optical or radio panels. As will be appreciated by one of skill in the art, the receiving or reflective surface may be generally planar or parabolic in shape.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A coupling mechanism comprising:
   a grip, wherein the grip includes:
      a jaw; and
      a jaw actuator mechanically coupled to the jaw, the jaw actuator adapted to actuate the jaw; and
   a coupler, wherein the coupler includes:
      a handle, the handle adapted to be engaged by the jaw upon operation of the jaw actuator; and
      a six degrees of freedom flexure, the six degrees of freedom flexure mechanically coupled to the handle.

2. The coupling mechanism of claim 1, wherein the six degrees of freedom flexure includes:
   a first mounting block;
   a second mounting block opposite the first mounting block; and
   at least two beams, the at least two beams adapted to connect the first mounting block to the second mounting block, each of the at least two beams including:
      a first section; and
      a second section;
      wherein the first section is connected to the second section, and
      wherein each of the first section and the second section is one of a curvilinear section, a straight arm section, an angle section, a ball-and-socket, a hinge, and a spring.

3. The coupling mechanism of claim 2, wherein a physical configuration of a first of the at least two beams are different from a physical configuration of a second of the at least two beams, the at least two beams thereby placing the six degrees of freedom flexure in tension.

4. The coupling mechanism of claim 2, further comprising potting material, the potting material being located between a portion of at least two of the at least two beams.

5. The coupling mechanism of claim 2, wherein a material used to form the at least two beams are more compliant at a first temperature and less compliant at a second temperature different from the first temperature.

6. The coupling mechanism of claim 2, wherein the at least two beams are adapted to provide a hard stop limit to at least one of the six degrees of freedom.

7. The coupling mechanism of claim 2, wherein a compliance of each degree of freedom of the six degrees of freedom of the flexure is determined by one or more of a geometry, a cross-sectional area, a cross-sectional shape, and a material of the first section and the second section.

8. The coupling mechanism of claim 1, wherein the jaw includes at least one clamp adapted to engage the handle upon operation of the jaw actuator.

9. The coupling mechanism of claim 1, wherein the jaw actuator includes:
   a jaw motor;
   a jaw gear drive mechanically coupled to the jaw motor, the jaw gear drive adapted to rotate upon operation of the jaw motor; and
   a plurality of actuation arms mechanically coupled to the jaw gear drive and to the jaw, the plurality of actuation arms adapted to extend or retract upon rotation of the jaw gear drive.

10. The coupling mechanism of claim 9, wherein the plurality of actuation arms is adapted to lock the relative positions of the grip and the coupler.

11. The coupling mechanism of claim 1, wherein the coupler further includes a handle actuator mechanically coupled to the handle, the handle actuator adapted to extend or retract the handle.

12. The coupling mechanism of claim 11, wherein the handle actuator includes:
   a handle motor; and
   a handle gear drive mechanically coupled to the handle motor and to the handle, the handle gear drive adapted to rotate upon operation of the handle motor, wherein the handle gear drive is adapted to extend the handle prior to engagement of the handle by the jaw, and wherein the handle gear drive is adapted to retract the handle after engagement of the handle by the jaw.

13. The coupling mechanism of claim 1, wherein the grip further includes a grip six degrees of freedom flexure, the grip six degrees of freedom flexure adapted to mechanically couple the grip to a grip panel.

14. The coupling mechanism of claim 1, wherein the coupler further includes a coupler six degrees of freedom flexure, the coupler six degrees of freedom flexure adapted to mechanically couple the coupler to a coupler panel.

15. The coupling mechanism of claim 1, wherein the jaw actuator includes:
   a spring; and a spring release, the spring release adapted to release the spring, thereby causing the jaw to engage the handle.

16. The coupling mechanism of claim 1,
wherein the grip further includes:
   a first electrical coupler mechanically coupled to the jaw;
wherein the coupler further includes:
   a second electrical coupler mechanically coupled to the handle; and
wherein the first electrical coupler is adapted to be electrically coupled to the second electrical coupler when the jaw engages the handle.

17. The coupling mechanism of claim 1,
wherein the grip further includes:
   a first fiber optic connector mechanically coupled to the jaw;
wherein the coupler further includes:
   a second fiber optic connector mechanically coupled to the handle; and
wherein the first fiber optic connector is adapted to be optically connected to the second fiber optic connector when the jaw engages the handle.

18. The coupling mechanism of claim 1,
wherein the grip further includes:
   a first portion of a self-aligning feature;
wherein the coupler further includes:
   a second portion of the self-aligning feature; and
wherein the first portion of the self-aligning feature and the second portion of the self-aligning feature are adapted to engage with one another so as to align the grip and the coupler.

* * * * *